(12) United States Patent
Bae et al.

(10) Patent No.: US 9,518,223 B2
(45) Date of Patent: Dec. 13, 2016

(54) LIQUID CRYSTAL COMPOSITION AND LIQUID CRYSTAL DISPLAY INCLUDING THE SAME

(71) Applicant: Samsung Display Co., Ltd., Yongin-si, Gyeonggi-do (KR)

(72) Inventors: Ji Hong Bae, Yongin-si (KR); Keun Chan Oh, Cheonan-si (KR)

(73) Assignee: Samsung Display Co., Ltd. (KR)

(*) Notice: Subject to any disclaimer, the term of this patent is extended or adjusted under 35 U.S.C. 154(b) by 0 days.

(21) Appl. No.: 14/867,315

(22) Filed: Sep. 28, 2015

(65) Prior Publication Data

US 2016/0200978 A1    Jul. 14, 2016

(30) Foreign Application Priority Data

Jan. 13, 2015 (KR) .......................... 10-2015-0006324

(51) Int. Cl.
| | | |
|---|---|---|
| C09K 19/34 | (2006.01) | |
| C09K 19/56 | (2006.01) | |
| G02F 1/1337 | (2006.01) | |
| G02F 1/137 | (2006.01) | |
| C09K 19/12 | (2006.01) | |
| C09K 19/30 | (2006.01) | |

(52) U.S. Cl.
CPC ........... C09K 19/3402 (2013.01); C09K 19/56 (2013.01); G02F 1/137 (2013.01); G02F 1/133711 (2013.01); C09K 2019/123 (2013.01); C09K 2019/3009 (2013.01); C09K 2019/3422 (2013.01); G02F 2001/13712 (2013.01)

(58) Field of Classification Search
CPC ................ C09K 19/3402; C09K 19/56; C09K 2019/3422; G02F 1/133711; G02F 1/137; G02F 2001/13712
USPC .............. 252/299.01, 299.6, 299.61; 428/1.1
See application file for complete search history.

(56) References Cited

U.S. PATENT DOCUMENTS 5,536,442 A * 7/1996 Reiffenrath ........... C07C 17/093
                                                  252/299.01
7,731,865 B2    6/2010 Bernatz et al.
(Continued)

FOREIGN PATENT DOCUMENTS

| | | |
|---|---|---|
| CN | 101418220 A | 4/2009 |
| CN | 101821670 A | 9/2010 |
| CN | 101821670 B | 12/2011 |
| CN | 102364386 A | 2/2012 |
| CN | 102597166 A | 7/2012 |
| CN | 101418220 B | 6/2014 |
| CN | 103848738 A | 6/2014 |
| DE | 102008050375 A1 | 4/2009 |
| DE | 102010047409 A1 | 5/2011 |
| EP | 2053113 A1 | 4/2009 |
| EP | 2202565 A1 | 6/2010 |
| EP | 2053113 B1 | 4/2011 |
| EP | 2494003 B1 | 7/2013 |
| JP | 2009-102639 A | 5/2009 |
| JP | 5000722 B2 | 8/2012 |
| JP | 2012-177935 A | 9/2012 |
| JP | 2013-509457 A | 3/2013 |
| JP | 5476427 | 2/2014 |
| KR | 10-2009-0040859 A | 4/2009 |
| KR | 10-2010-0060036 A | 6/2010 |
| KR | 10-2010-0070337 A | 6/2010 |
| KR | 10-101169149 | 7/2012 |
| KR | 10-2012-0103600 A | 9/2012 |
| KR | 10-2013-0019350 A | 2/2013 |
| KR | 10-2014-0004180 A | 1/2014 |
| KR | 10-2014-0035971 A | 3/2014 |
| TW | 200930797 A | 7/2009 |
| TW | 201130959 A | 9/2011 |
| WO | 2009/050869 A1 | 4/2009 |
| WO | 2009050869 A1 | 4/2009 |
| WO | 2011-050893 A1 | 5/2011 |

*Primary Examiner* — Geraldina Visconti
(74) *Attorney, Agent, or Firm* — Innovation Counsel LLP

(57) ABSTRACT

A liquid crystal composition includes a photoinitiator; an alignment aid; a neutral liquid crystal compound; and a polar liquid crystal compound, wherein the neutral liquid crystal compound includes at least one of compounds represented by Chemical Formulas N-1 to N-10 below:

Chemical Formula N-1

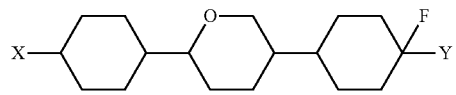

Chemical Formula N-2

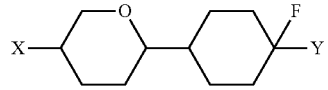

Chemical Formula N-3

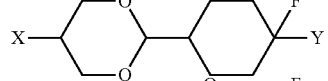

Chemical Formula N-4

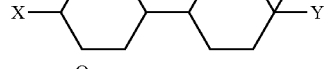

Chemical Formula N-5

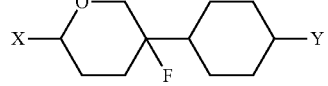

Chemical Formula N-6

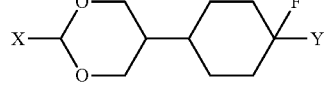

Chemical Formula N-7

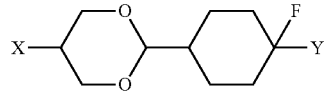

Chemical Formula N-8

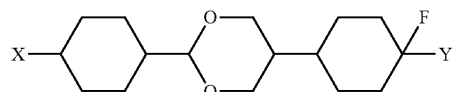

Chemical Formula N-9

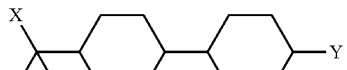

Chemical Formula N-10

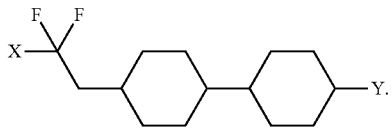

20 Claims, 10 Drawing Sheets

(56) References Cited

U.S. PATENT DOCUMENTS

| | | |
|---|---|---|
| 8,092,871 B2 | 1/2012 | Usui et al. |
| 8,114,310 B2 | 2/2012 | Bernatz et al. |
| 8,361,570 B2 | 1/2013 | Usui et al. |
| 2009/0103011 A1 | 4/2009 | Bernatz et al. |
| 2010/0302491 A1 | 12/2010 | Usui et al. |
| 2012/0127407 A1 | 5/2012 | Usui et al. |
| 2012/0224124 A1 | 9/2012 | Goetz et al. |

* cited by examiner

LIQUID CRYSTAL COMPOSITION AND LIQUID CRYSTAL DISPLAY INCLUDING THE SAME

CROSS-REFERENCE TO RELATED APPLICATION

This application claims priority to and the benefit of Korean Patent Application No. 10-2015-0006324 filed in the Korean Intellectual Property Office on Jan. 13, 2015, the entire contents of which are incorporated herein by reference.

BACKGROUND (a) Field

The present inventive concept relates to a liquid crystal composition, and a liquid crystal display including the same.

(b) Description of the Related Art

A liquid crystal display (LCD) is one of the most widely used flat panel displays at present, and includes two display panels facing each other, a liquid crystal layer interposed between two display panels, an electric field generating electrode such as a pixel electrode and a common electrode positioned on at least one of two display panels, and the like.

In the liquid crystal display, an electric field is generated in a liquid crystal layer by applying a voltage to the electric field generating electrode, such that direction of liquid crystal molecules positioned in the liquid crystal layer may be determined, and transmittance of light transmitting the liquid crystal layer may be adjusted.

In the liquid crystal display, a liquid crystal composition is significantly important in adjusting transmittance of light to obtain a desired image. In particular, as various uses have been made of liquid crystal displays, various characteristics, such as low voltage operation, high voltage holding ratio (VHR), wide viewing angle characteristic, wide dynamic temperature range, high speed response, and the like, have been required of liquid crystal displays.

In order for a liquid crystal display to have a high-speed response characteristic, and the like, research into technology for improving physical properties, such as rotation viscosity, refractive index, elastic coefficient, and the like, of the liquid crystal composition has been conducted.

The above information disclosed in this Background section is only for enhancement of understanding of the background of the inventive concept and therefore it may contain information that does not form the prior art that is already known to a person of ordinary skill in the art.

SUMMARY

A novel liquid crystal composition, a liquid crystal display including the same, and a manufacturing method thereof having advantages of having high-speed response characteristic and improved reliability are provided.

In one aspect, a liquid crystal composition includes a photoinitiator; an alignment aid; a neutral liquid crystal compound; and a polar liquid crystal compound, wherein the neutral liquid crystal compound includes at least one of compounds represented by Chemical Formulas N-1 to N-10 below:

Chemical Formula N-1

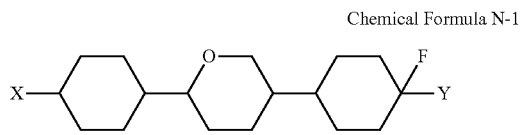

Chemical Formula N-2

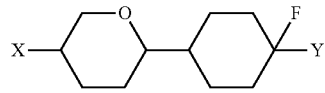

Chemical Formula N-3

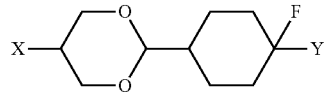

Chemical Formula N-4

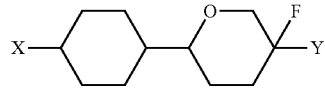

Chemical Formula N-5

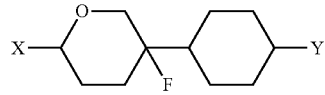

Chemical Formula N-6

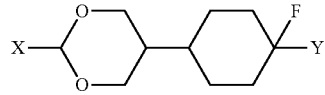

Chemical Formula N-7

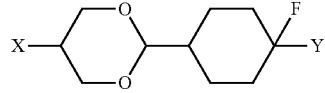

Chemical Formula N-8

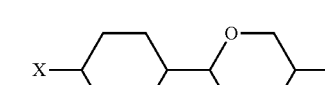

Chemical Formula N-9

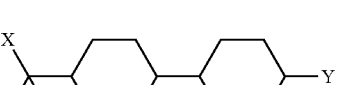

Chemical Formula N-10

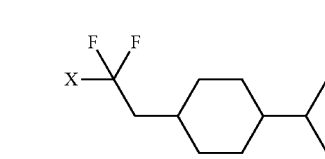

in Chemical Formulas N-1 to N-10 above, X and Y each independently includes one C1-C5 alkyl group.

The polar liquid crystal compound may include at least one of compounds represented by Chemical Formulas NP-1 to NP-7 below:

Chemical Formula NP-1

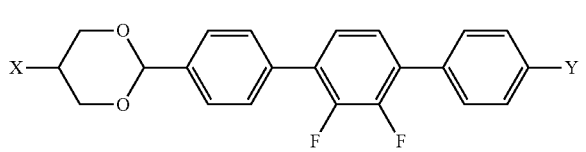

Chemical Formula NP-2

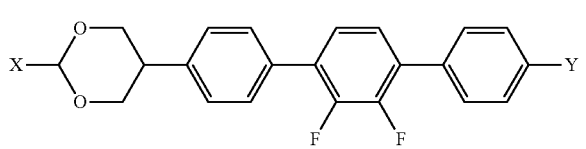

Chemical Formula NP-3
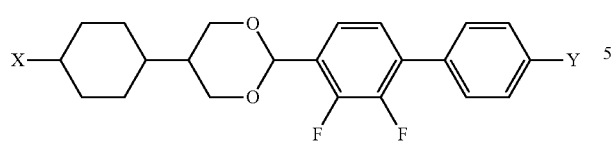

Chemical Formula NP-4
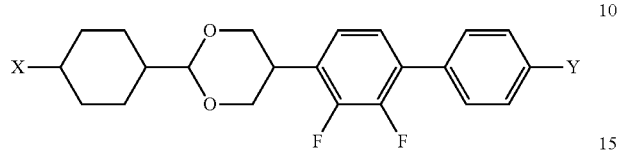

Chemical Formula NP-5
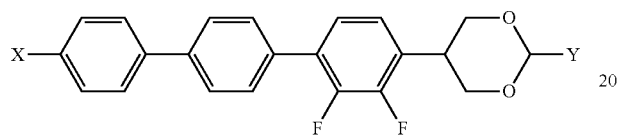

Chemical Formula NP-6
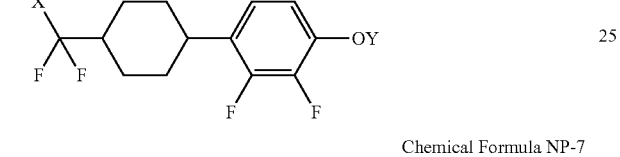

Chemical Formula NP-7
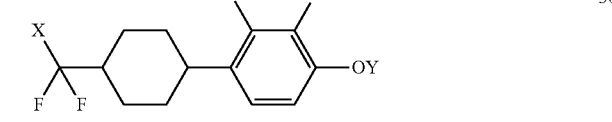

in Chemical Formulas NP-1 to NP-7 above, X and Y each independently includes one C1-C5 alkyl group.

The liquid crystal composition may further include at least one of compounds represented by Chemical Formulas G-1 to G-10 below:

Chemical Formula G-1
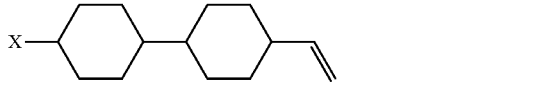

Chemical Formula G-2
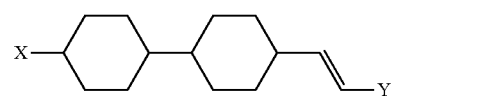

Chemical Formula G-3
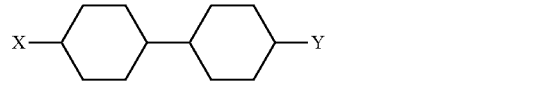

Chemical Formula G-4
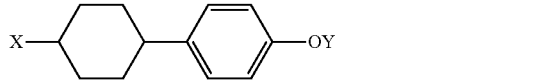

Chemical Formula G-5
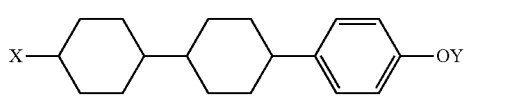

Chemical Formula G-6
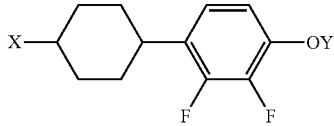

Chemical Formula G-7
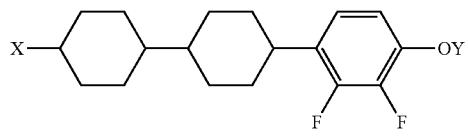

Chemical Formula G-8
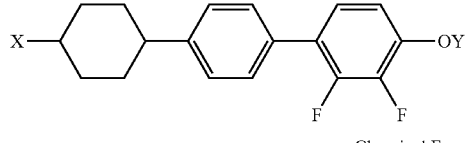

Chemical Formula G-9
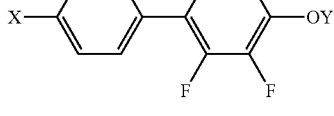

Chemical Formula G-10
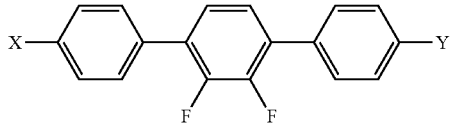

in Chemical Formulas G-1 to G-10 above, X and Y each independently includes one C1-C5 alkyl group.

The compound represented by Chemical Formula G-10 above may be excluded from the liquid crystal composition.

The compounds represented by Chemical Formulas G-1 and G-2 above may be excluded from the liquid crystal composition.

The liquid crystal composition may further include at least one of polar liquid crystal compounds represented by Chemical Formulas PI-1 to PI-4 below:

Chemical Formula PI-1
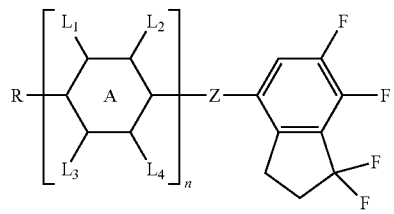

Chemical Formula PI-2
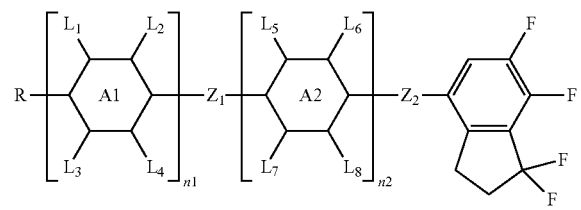

-continued

Chemical Formula PI-3

[structure: R—[L1,L2,A,L3,L4]n—Z—indane with F,F,F,F substituents]

Chemical Formula PI-4

[structure: R—[L1,L2,A1,L3,L4]n1—Z1—[L5,L6,A2,L7,L8]n2—Z2—indane with F,F,F,F substituents]

in Chemical Formulas PI-1 to PI-4 above, n, n1, and n2 are 1 to 3; A, A1 and A2 each independently is one of

[cyclohexyl], [tetrahydropyran-2,5-diyl], [tetrahydropyran-2,6-diyl], [cyclohexenyl], [cyclohexenyl], and [1,3-dioxane-2,5-diyl], and [1,3-dioxane-2,5-diyl];

L1 to L8 each independently is H, F, Cl, $OCF_3$, $CF_3$, $CH_2F$ and $CHF_2$; Z, Z1, and Z2 each independently is —COO—, —OCO—, —$CF_2O$—, —$OCF_2$—, —$CH_2O$, —$OCH_2$—, —$SCH_2$—, $CH_2S$—, —$CH_2CH_2$—, —$C_2F_4$—, —$CH_2$—$CF_2$—, —$CF_2CH_2$—, —$(CH_2)_z$- (z is 1 to 3), —CH=CH—, —CF=CF—, —CH=CF—, —CF=CH—, —C≡C— and —CH=CH$CH_2$O—, and in Chemical Formulas PI-1 to PI-4 above, R each independently includes one of hydrogen, halogen, a cyano group and a C1 to C12 alkyl group.

The polar liquid crystal compounds represented by Chemical Formulas PI-1 to PI-4 above may have a dielectric anisotropy (Δ∈) of 10 to 30.

The photoinitiator may be included in a content of 0.005 wt % to 0.5 wt % (based on the total weight of the liquid crystal composition).

The photoinitiator may include a light absorption wavelength range of 240 nanometer to 380 nanometer.

The alignment aid may include a polymerization group.

In another aspect, a liquid crystal display includes: a first substrate; a second substrate facing the first substrate; and a liquid crystal layer positioned between the first substrate and the second substrate, wherein the liquid crystal layer includes a photoinitiator, an alignment aid, a neutral liquid crystal compound, and a polar liquid crystal compound, and wherein the neutral liquid crystal compound includes at least one of compounds represented by Chemical Formulas N-1 to N-10 below:

Chemical Formula N-1

Chemical Formula N-2

Chemical Formula N-3

Chemical Formula N-4

Chemical Formula N-5

Chemical Formula N-6

Chemical Formula N-7

Chemical Formula N-8

Chemical Formula N-9

Chemical Formula N-10 in Chemical Formulas N-1 to N-10 above, X and Y each independently includes one C1-C5 alkyl group.

The polar liquid crystal compound may include at least one of compounds represented by Chemical Formulas NP-1 to NP-7 below:

Chemical Formula NP-1

Chemical Formula NP-2

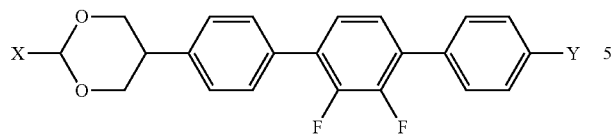

Chemical Formula NP-3

Chemical Formula NP-4

Chemical Formula NP-5

Chemical Formula NP-6

Chemical Formula NP-7

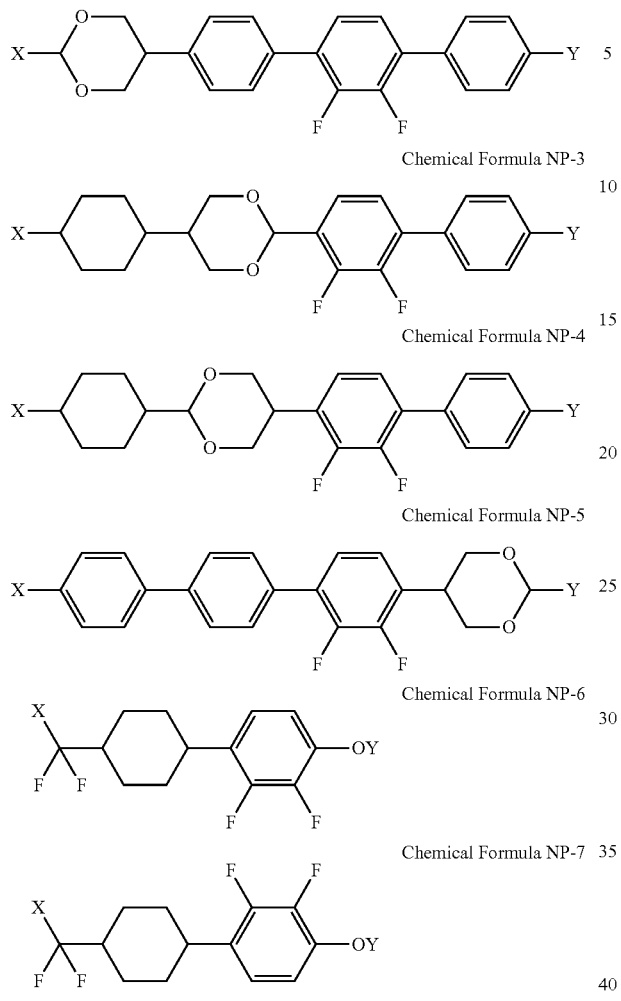

in Chemical Formulas NP-1 to NP-7 above, X and Y each independently includes one C1-C5 alkyl group.

The liquid crystal layer may further include at least one of compounds represented by Chemical Formulas G-1 to G-10 below:

Chemical Formula G-1

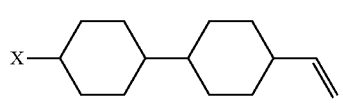

Chemical Formula G-2

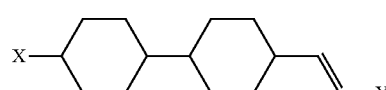

Chemical Formula G-3

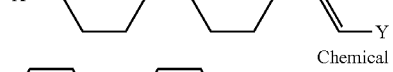

Chemical Formula G-4

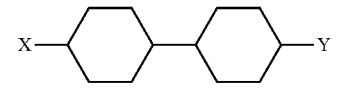

Chemical Formula G-5

Chemical Formula G-6

Chemical Formula G-7

Chemical Formula G-8

Chemical Formula G-9

Chemical Formula G-10

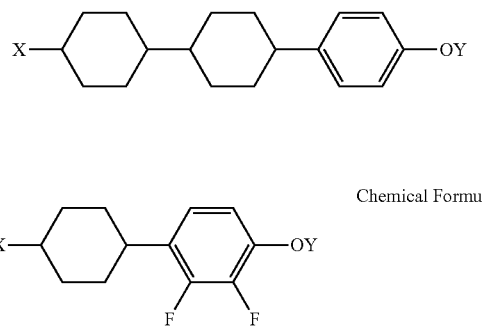

in Chemical Formulas G-1 to G-10 above, X and Y each independently includes one C1-C5 alkyl group.

The compound represented by Chemical Formula G-10 may be excluded from the liquid crystal layer.

The compounds represented by Chemical Formulas G-1 and G-2 may be excluded from the liquid crystal layer.

The liquid crystal layer may further include at least one of polar liquid crystal compounds represented by Chemical Formulas PI-1 to PI-4 below:

Chemical Formula PI-1

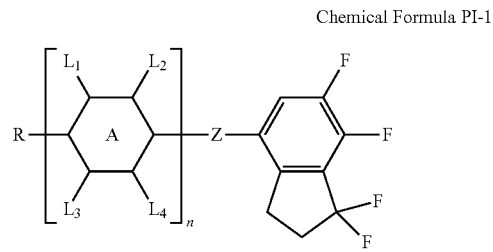

-continued

Chemical Formula PI-2

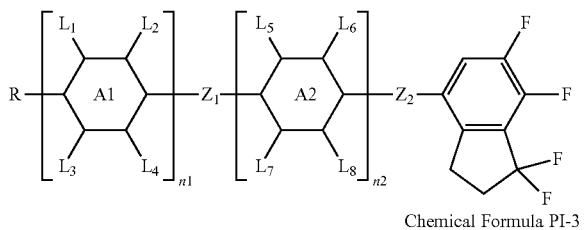

Chemical Formula PI-3

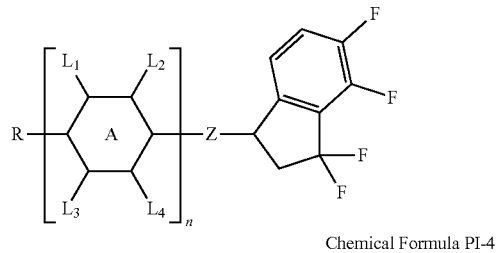

Chemical Formula PI-4

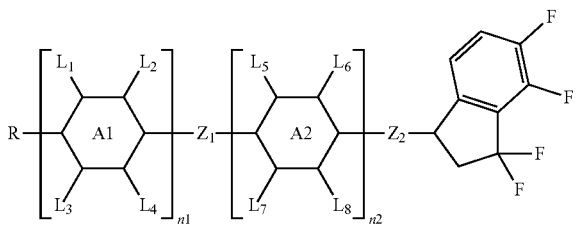

in Chemical Formulas PI-1 to PI-4 above, n, n1, and n2 are 1 to 3; A, A1 and A2 each independently is one of

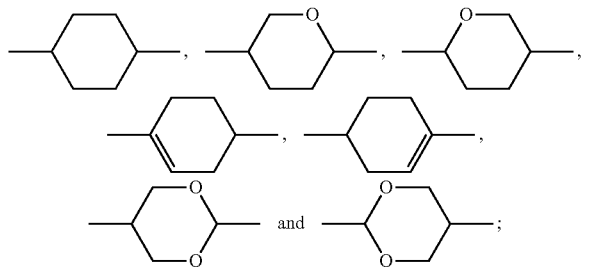

L1 to L8 each independently is H, F, Cl, $OCF_3$, $CF_3$, $CH_2F$ and $CHF_2$; Z, Z1, and Z2 each independently is —COO—, —OCO—, —$CF_2O$—, —$OCF_2$—, —$CH_2O$, —$OCH_2$—, —$SCH_2$—, $CH_2S$—, —$CH_2CH_2$—, —$C_2F_4$—, —$CH_2$—$CF_2$—, —$CF_2CH_2$—, —$(CH_2)z$- (z is 1 to 3), —CH=CH—, —CF=CF—, —CH=CF—, —CF=CH—, —C≡C— and —CH=$CHCH_2O$—, and in Chemical Formulas PI-1 to PI-4 above, R each independently includes one of hydrogen, halogen, a cyano group and a C1 to C12 alkyl group.

The polar liquid crystal compounds represented by Chemical Formulas PI-1 to PI-4 above may have a dielectric anisotropy (Δ∈) of 10 to 30.

The photoinitiator may be included in a content of 0.005 wt % to 0.5 wt % (based on the total weight of the liquid crystal layer).

The photoinitiator may include a light absorption wavelength range of 240 nanometer to 380 nanometer.

The alignment aid may include a polymerization group.

In yet another aspect, a manufacturing method of a liquid crystal display includes: forming an electric field generating electrode on at least one of a first substrate and a second substrate facing the first substrate; forming a liquid crystal layer including a photoinitiator, an alignment aid, a neutral liquid crystal compound, and a polar liquid crystal compound between the first substrate and the second substrate; and forming an alignment polymer by irradiating light on the liquid crystal layer in a state in which an electric field is applied, wherein the neutral liquid crystal compound includes at least one of compounds represented by Chemical Formulas N-1 to N-10 below:

Chemical Formula N-1

Chemical Formula N-2

Chemical Formula N-3

Chemical Formula N-4

Chemical Formula N-5

Chemical Formula N-6

Chemical Formula N-7

Chemical Formula N-8

Chemical Formula N-9

Chemical Formula N-10

in Chemical Formulas N-1 to N-10 above, X and Y each independently includes one C1-C5 alkyl group.

The polar liquid crystal compound may include at least one of compounds represented by Chemical Formulas NP-1 to NP-7 below:

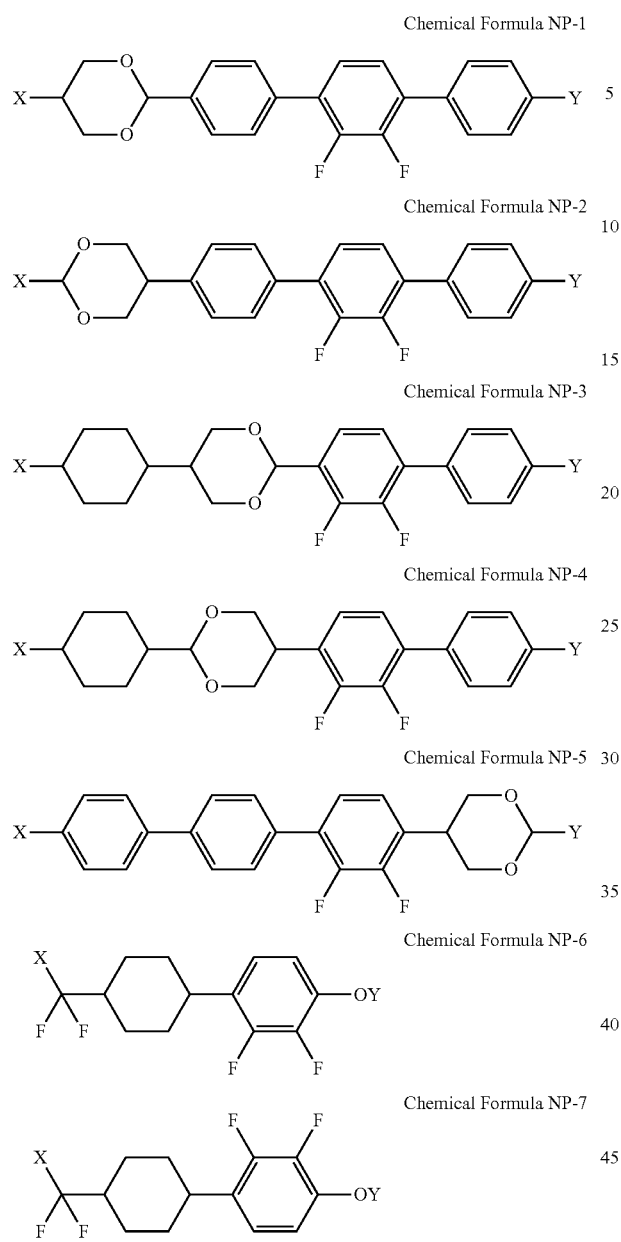

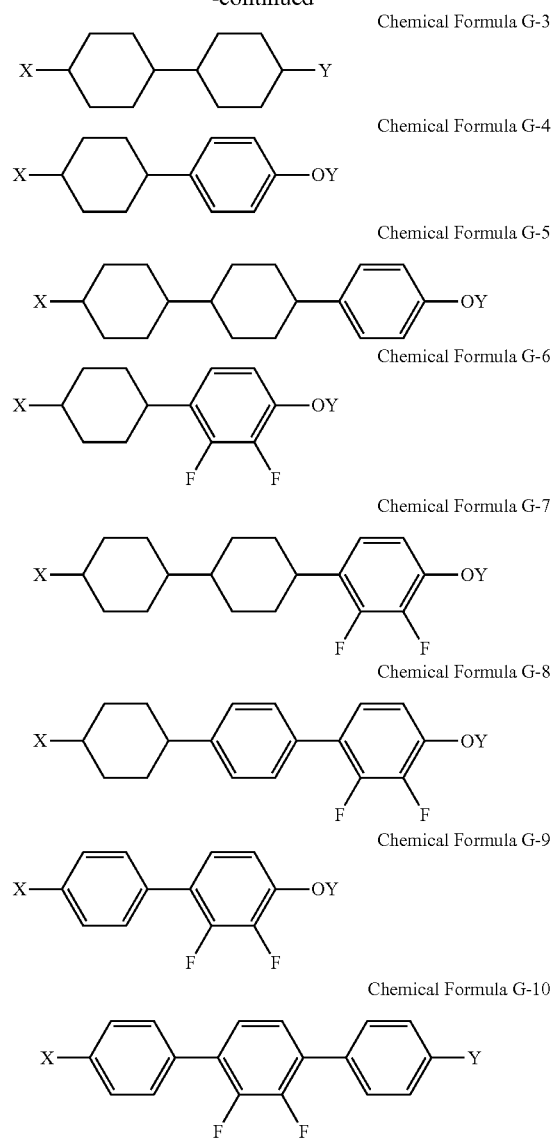

in Chemical Formulas NP-1 to NP-7 above, X and Y each independently includes one C1-C5 alkyl group.

The liquid crystal layer may further include at least one of compounds represented by Chemical Formulas G-1 to G-10 below:

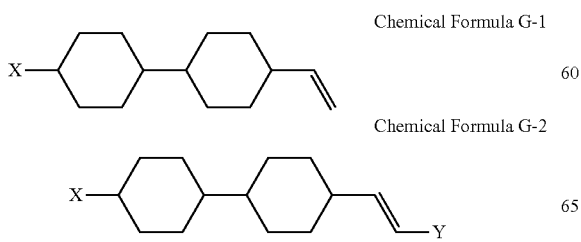

in Chemical Formulas G-1 to G-10 above, X and Y each independently includes one C1-C5 alkyl group.

The compound represented by Chemical Formula G-10 may be excluded from the liquid crystal layer.

The compounds represented by Chemical Formulas G-1 and G-2 may be excluded from the liquid crystal layer.

The liquid crystal layer may further include at least one of the polar liquid crystal compounds represented by Chemical Formulas PI-1 to PI-4 below:

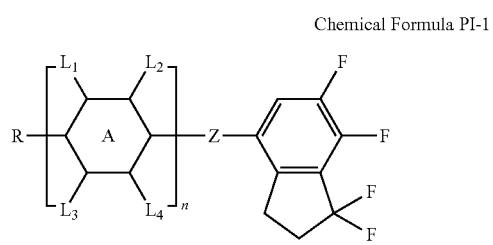

Chemical Formula PI-2

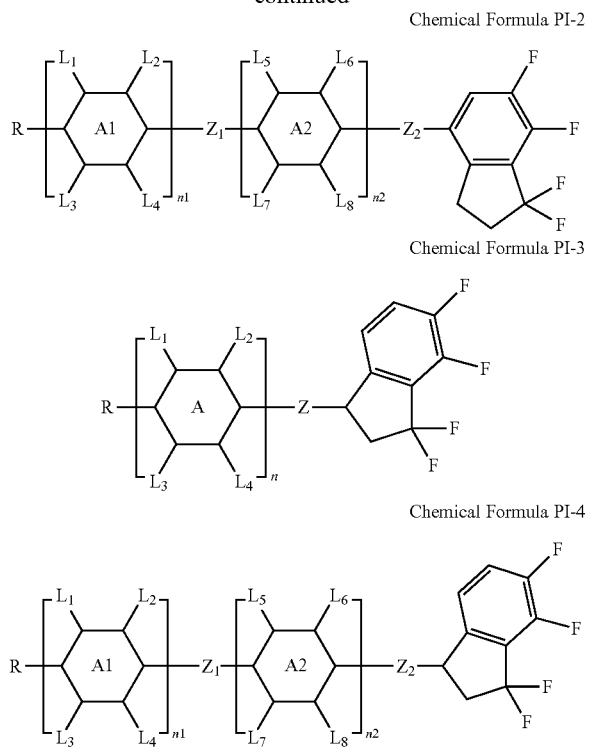

Chemical Formula PI-3

Chemical Formula PI-4 in Chemical Formulas PI-1 to PI-4 above, n, n1, and n2 are 1 to 3; A, A1 and A2 each independently is one of

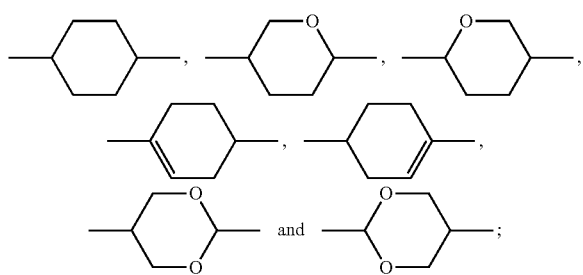

L1 to L8 each independently is H, F, Cl, $OCF_3$, $CF_3$, $CH_2F$ and $CHF_2$; Z, Z1, and Z2 each independently is —COO—, —OCO—, —$CF_2$O—, —O$CF_2$—, —$CH_2$O—, —O$CH_2$—, —S$CH_2$—, $CH_2$S—, —$CH_2CH_2$—, —$C_2F_4$—, —$CH_2$—$CF_2$—, —$CF_2CH_2$—, —$(CH_2)z$- (z is 1 to 3), —CH=CH—, —CF=CF—, —CH=CF—, —CF=CH—, —C≡C— and —CH=CH$CH_2$O—, and in Chemical Formulas PI-1 to PI-4 above, R each independently includes one of hydrogen, halogen, a cyano group and a C1 to C12 alkyl group.

The photoinitiator may include a light absorption wavelength range of 240 nanometer to 380 nanometer.

According to an exemplary embodiment of the present inventive concept, the liquid crystal display having high-speed response characteristic and improved reliability may be achieved by adding the photoinitiator and the alignment aid to the liquid crystal composition including the novel neutral liquid crystal compound and/or the novel polar liquid crystal compound.

DETAILED DESCRIPTION OF THE EMBODIMENTS

Figure 1:
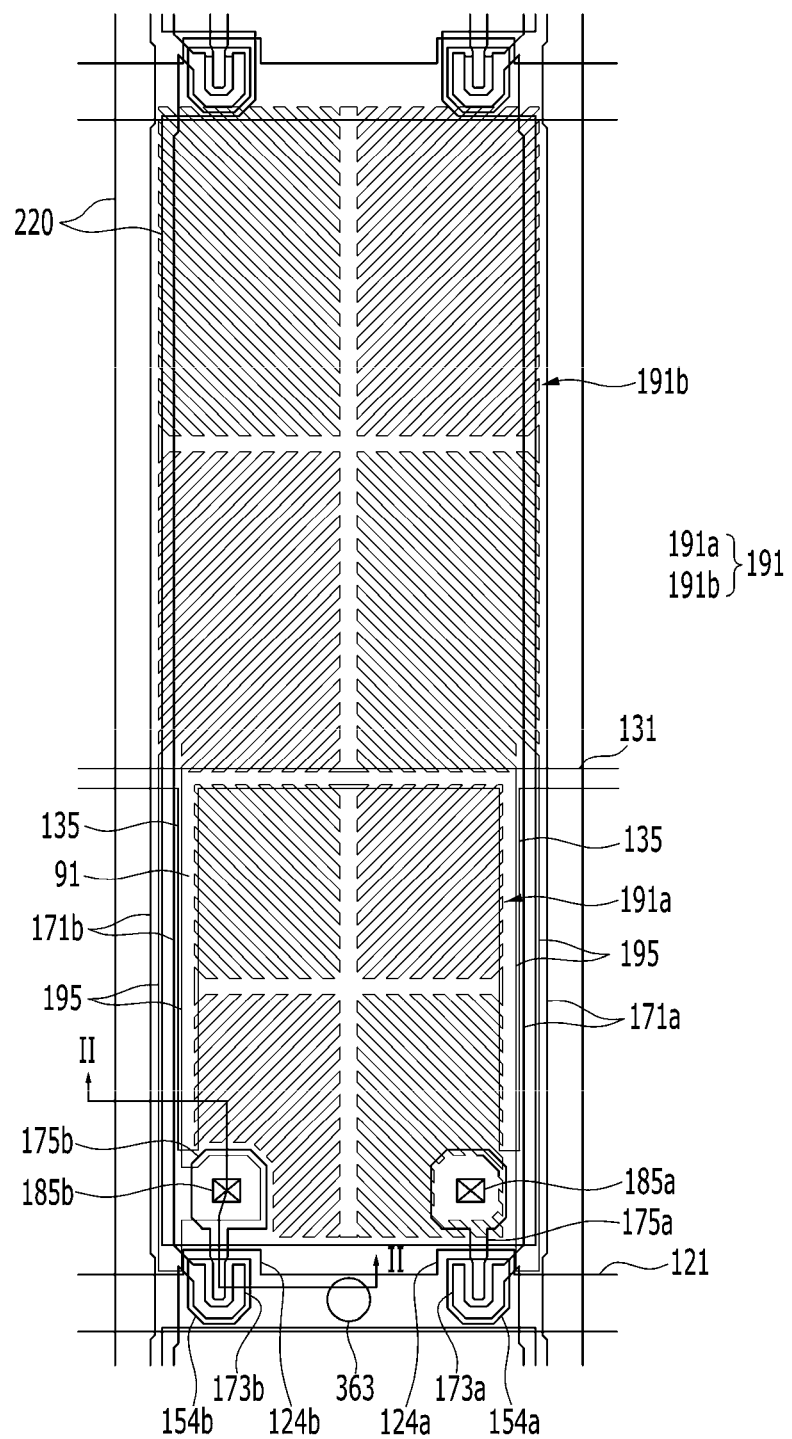
FIG. 1 is a top plan view of a liquid crystal display according to an exemplary embodiment of the present inventive concept.

Hereinafter, exemplary embodiments of the present inventive concept will be described in detail with reference to the accompanying drawings. However, the present inventive concept is not limited to the exemplary embodiments which are described herein, and may be modified in various different ways. Rather, the exemplary embodiments of the present inventive concept to be described below to provided disclosed features and the idea of the present inventive concept.

In the drawings, thicknesses of layers and regions are exaggerated for clarity. In addition, in the case in which it is stated that a layer is present 'on' another layer or a substrate, the layer may be directly formed on another layer or the substrate, or have the other layer interposed therebetween. Portions denoted by like reference numerals mean like elements throughout the specification.

A liquid crystal composition according to an exemplary embodiment of the present inventive concept includes a photoinitiator, an alignment aid, a neutral liquid crystal compound and a polar liquid crystal compound.

In the present exemplary embodiment, the neutral liquid crystal compound includes at least one of the compounds represented by Chemical Formulas N-1 to N-10 below:

Chemical Formula N-1

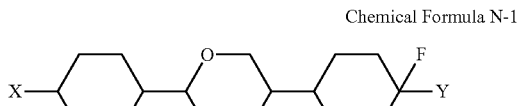

Chemical Formula N-2

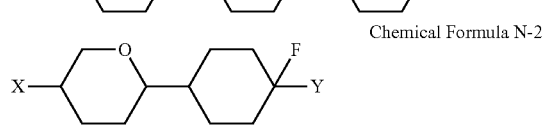

Chemical Formula N-3
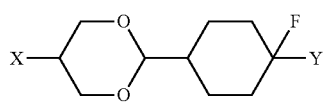

Chemical Formula N-4
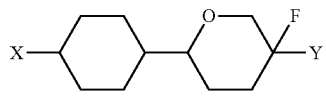

Chemical Formula N-5
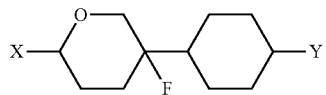

Chemical Formula N-6
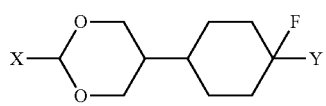

Chemical Formula N-7
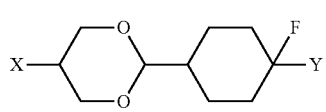

Chemical Formula N-8
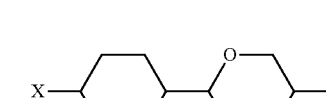

Chemical Formula N-9
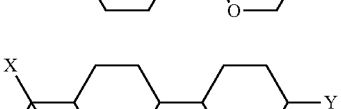

Chemical Formula N-10
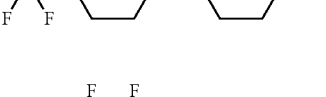

in Chemical Formulas N-1 to N-10 above, X and Y each independently includes one C1-C5 alkyl group.

In the present exemplary embodiment, the polar liquid crystal compound includes at least one of the compounds represented by Chemical Formulas NP-1 to NP-7 below:

Chemical Formula NP-1
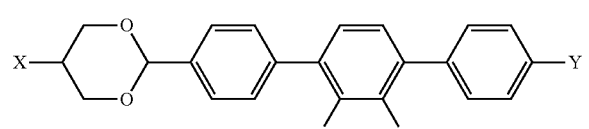

Chemical Formula NP-2
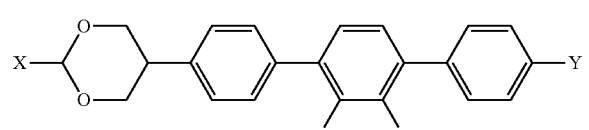

Chemical Formula NP-3
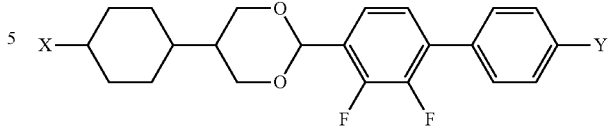

Chemical Formula NP-4
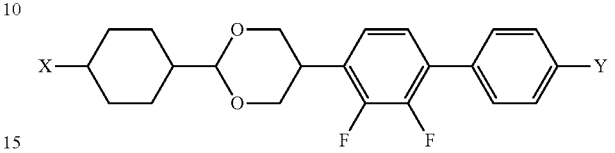

Chemical Formula NP-5
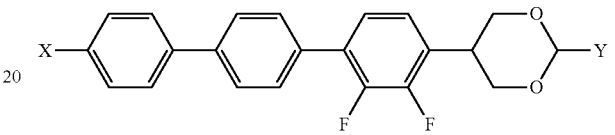

Chemical Formula NP-6

Chemical Formula NP-7
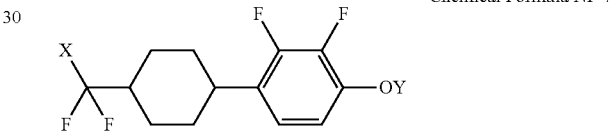

in Chemical Formulas NP-1 to NP-7 above, X and Y each independently includes one C1-C5 alkyl group.

The liquid crystal composition according to the present exemplary embodiment may further include at least one of the compounds represented by Chemical Formulas G-1 to G-10 below:

Chemical Formula G-1
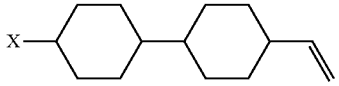

Chemical Formula G-2
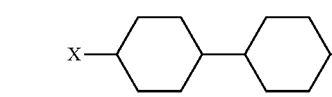

Chemical Formula G-3
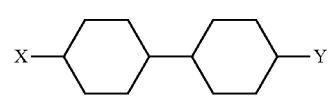

Chemical Formula G-4
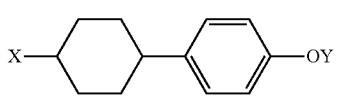

Chemical Formula G-5
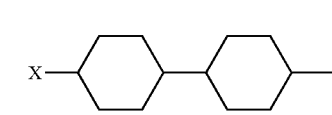

-continued

Chemical Formula G-6
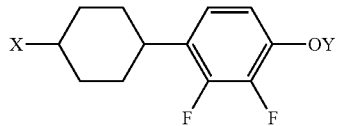

Chemical Formula G-7
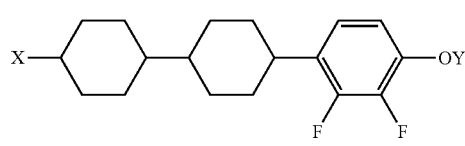

Chemical Formula G-8
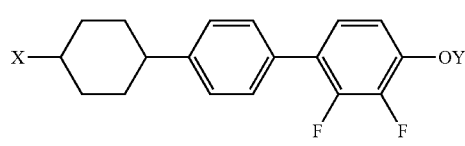

Chemical Formula G-9
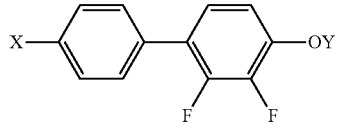

Chemical Formula G-10
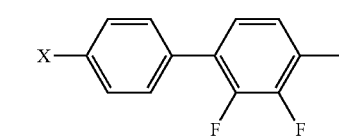

in Chemical Formulas G-1 to G-10 above, X and Y each independently includes one C1-C5 alkyl group.

With respect to the compound represented by Chemical Formula G-10, the liquid crystal composition according to an exemplary embodiment of the present inventive concept either may include the compound represented by Chemical Formula G-10 in a only a very small content or does not include the compound represented by Chemical Formula G-10 at all. The compound represented by Chemical Formula G-10 is a terphenyl-based liquid crystal compound, and the terphenyl-based liquid crystal compounds may increase the reactivity of a reactive mesogen, which is the alignment aid. However, the terphenyl-based liquid crystal compound deteriorates a voltage holding ratio showing reliability. Therefore, in the present exemplary embodiment, reliability of an element may be improved by not including the terphenyl-based liquid crystal compound or including the terphenyl-based liquid crystal compound in only a small content, and the decrease in the reactivity due to lack of the terphenyl-based liquid crystal compound may be minimized by adding the photoinitiator capable of increasing reactivity of the reactive mesogen. The photoinitiator according to the present exemplary embodiment may be added in a content of about 0.005 wt % to 0.5 wt % based on the overall liquid crystal composition, and may include a light absorption wavelength range of 240 nanometer to 380 nanometer.

The photoinitiator according to the present exemplary embodiment may include a benzoyl group. The photoinitiator may include at least one of the materials as listed below. The listed materials below may represent examples including the benzoyl group and other various practicable examples of the photoinitiator:

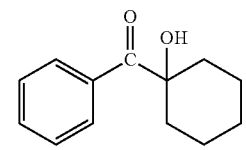

IRGACURE 184

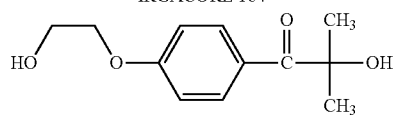

IRGACURE 2959

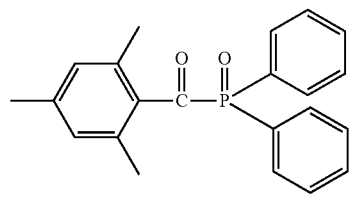

DAROCUR TPO

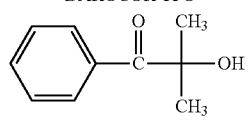

DAROCUR 1173

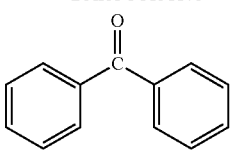

DAROCUR BP

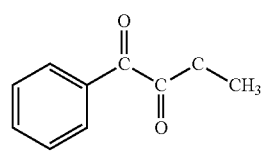

DAROCUR MBF

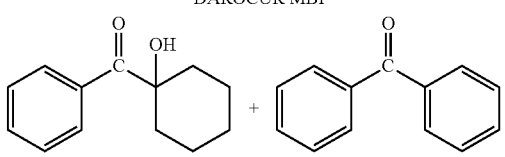

IRGACURE 500

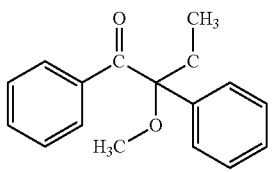

IRGACURE 651

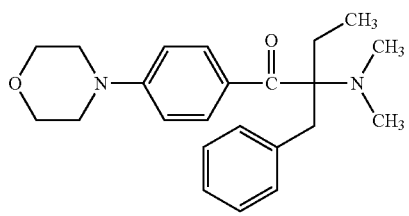

IRGACURE 369

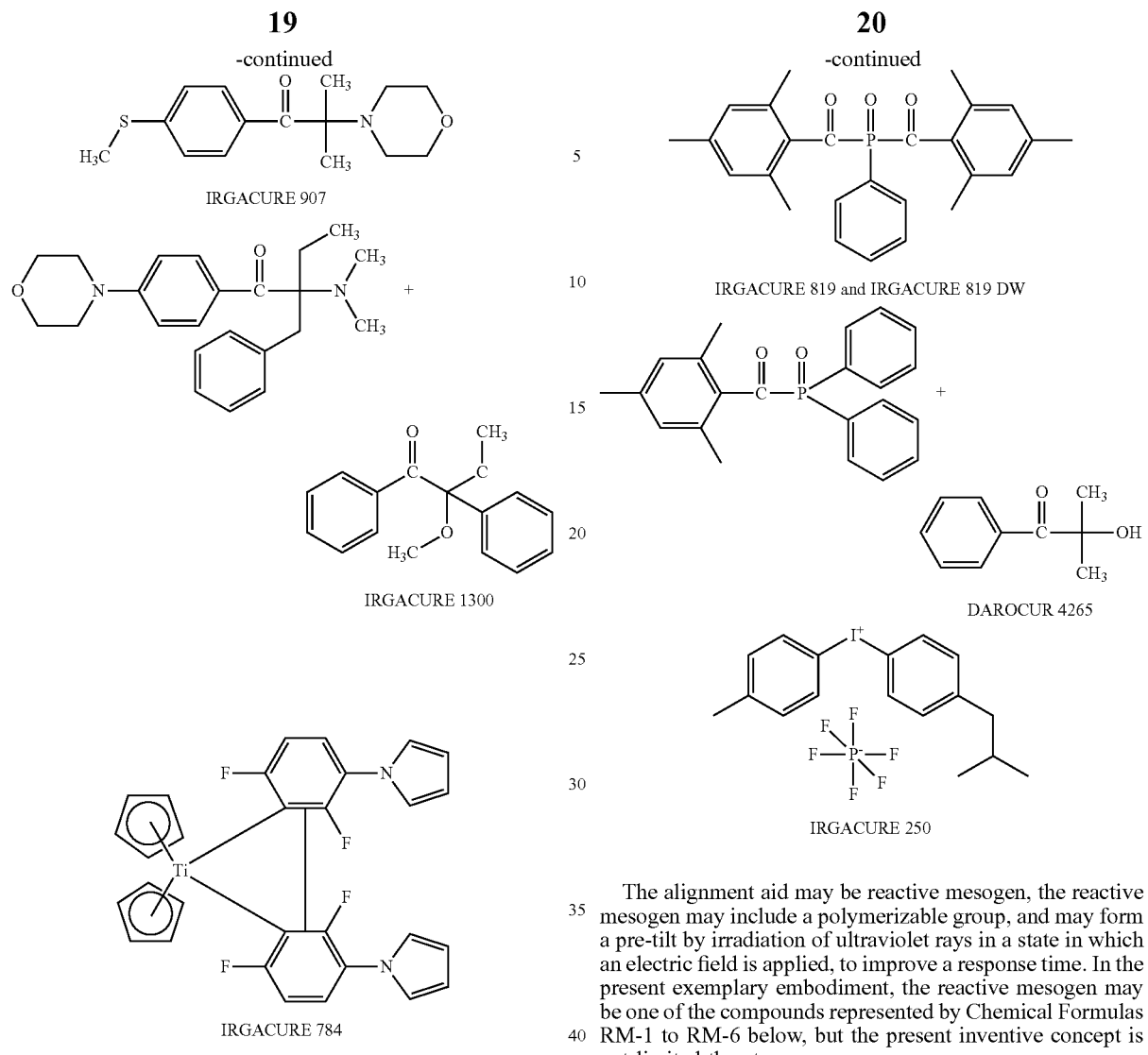

The alignment aid may be reactive mesogen, the reactive mesogen may include a polymerizable group, and may form a pre-tilt by irradiation of ultraviolet rays in a state in which an electric field is applied, to improve a response time. In the present exemplary embodiment, the reactive mesogen may be one of the compounds represented by Chemical Formulas RM-1 to RM-6 below, but the present inventive concept is not limited thereto:

Chemical Formula RM-1

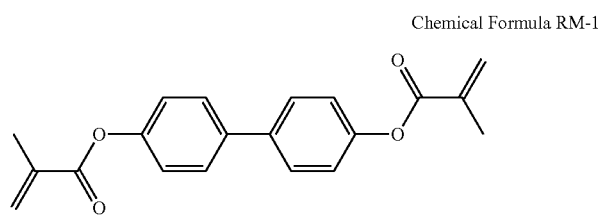

Chemical Formula RM-2

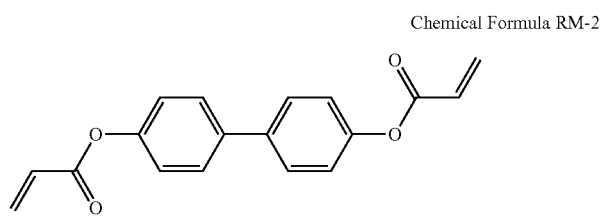

Chemical Formula RM-3

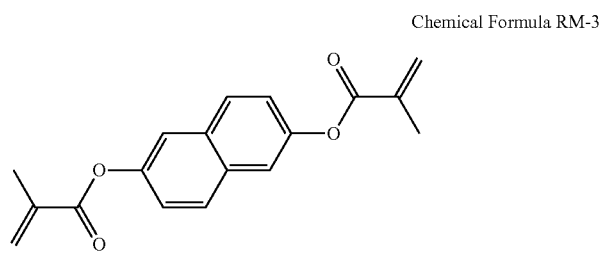

Chemical Formula RM-4

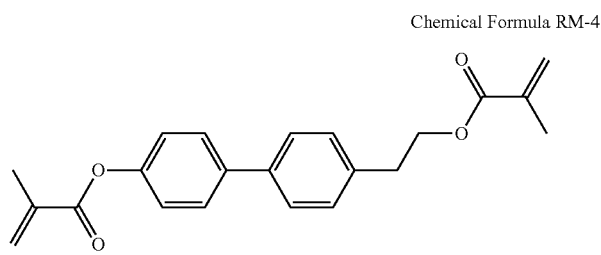

Chemical Formula RM-5

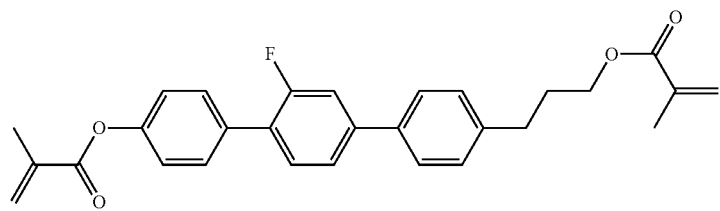

Chemical Formula RM-6

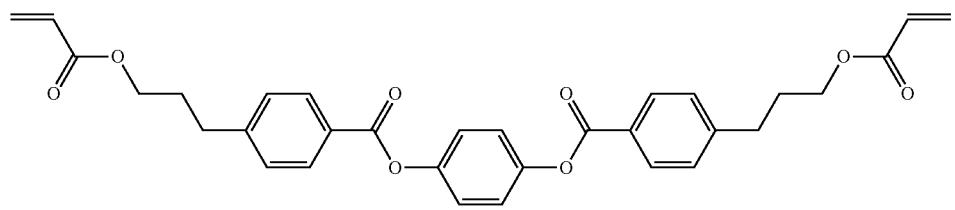

With respect to the compound represented by Chemical Formulas G-1 and G-2, the liquid crystal composition according to an exemplary embodiment of the present inventive concept either may include the compound represented by Chemical Formulas G-1 and G-2 in only a very small content or does not include the compounds represented by Chemical Formulas G-1 and G-2 at all. The compounds represented by Chemical Formulas G-1 and G-2 may be an alkenyl-based liquid crystal compound, and the alkenyl-based liquid crystal compound has a low density and as the content of the alkenyl-based liquid crystal compound is increased, a response speed also becomes increased. However, the alkenyl-based liquid crystal compound may deteriorate reactivity of the reactive mesogen which is the alignment aid. Therefore, in an exemplary embodiment of the present inventive concept, reliability of the element may be improved by not including the alkenyl-based liquid crystal compound or including the alkenyl-based liquid crystal compound in a small content, and the photoinitiator may be added to supplement the decrease in the reactivity of the reactive mesogen.

The liquid crystal composition according to an exemplary embodiment of the present inventive concept may further include at least one of the polar liquid crystal compounds represented by Chemical Formulas PI-1 to PI-4 below:

Chemical Formula PI-1

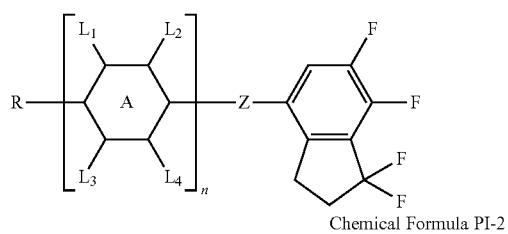

Chemical Formula PI-2

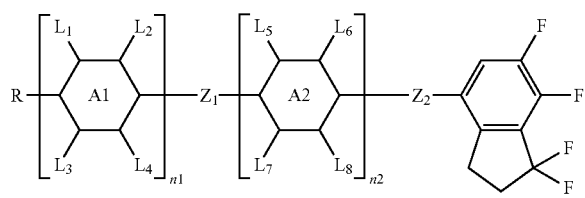

Chemical Formula PI-3

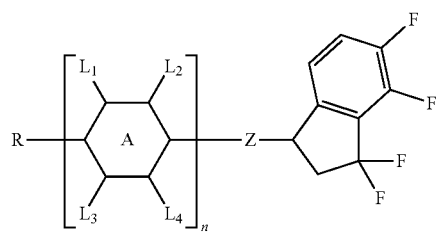

Chemical Formula PI-4

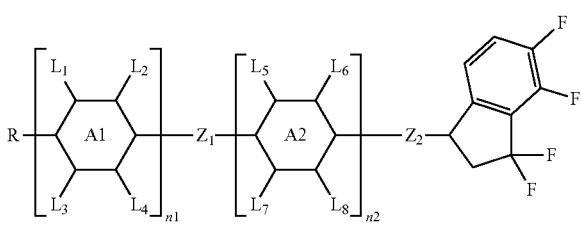

in Chemical Formulas PI-1 to PI-4 above, n, n1, and n2 are 1 to 3; A, A1 and A2 each independently is one of

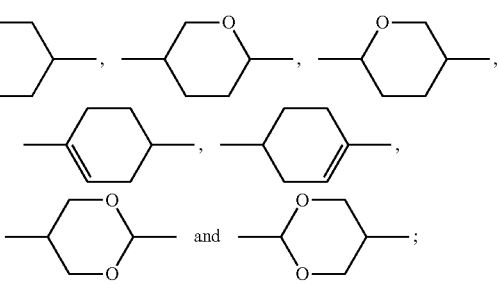

L1 to L8 each independently is H, F, Cl, $OCF_3$, $CF_3$, $CH_2F$ and $CHF_2$; Z, Z1, and Z2 each independently is —COO—, —OCO—, —$CF_2O$—, —$OCF_2$—, —$CH_2O$—, —$OCH_2$—, —$SCH_2$—, —$CH_2S$—, —$CH_2CH_2$—, —$C_2F_4$—, —$CH_2CF_2$—, —$CF_2CH_2$—, —$(CH_2)_z$- (z is 1 to 3), —CH=CH—, —CF=CF—, —CH=CF—, —CF=CH—, —C≡C— and —CH=$CHCH_2O$—, and in Chemical Formulas PI-1 to PI-4 above, R each independently includes one of hydrogen, halogen, a cyano group and a C1 to C12 alkyl group.

In the present exemplary embodiment, the polar liquid crystal compounds represented by Chemical Formulas PI-1 to PI-4 above preferably have a dielectric anisotropy (Δ∈) of 10 to 30.

Specifically, the compounds represented by Chemical Formulas PI-1 to PI-4 above may include at least one of compounds represented by PI-a to PI-f below:

Chemical Formula PI-a

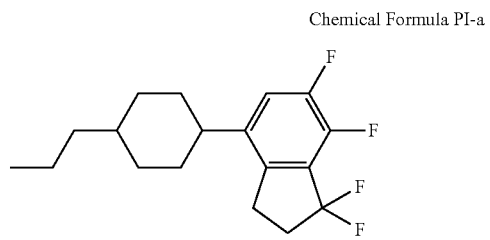

Chemical Formula PI-b

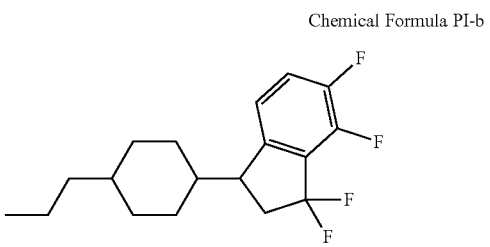

Chemical Formula PI-c

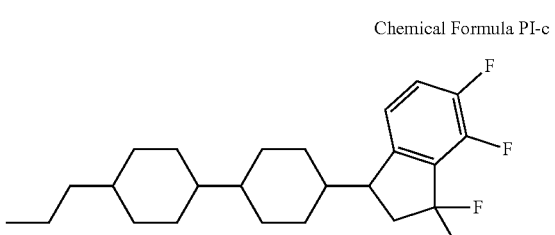

Chemical Formula PI-d

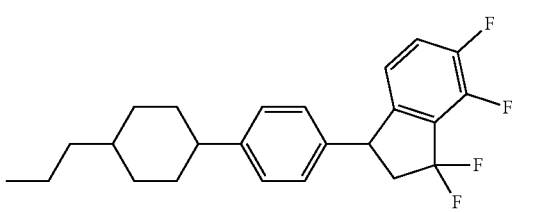

Chemical Formula PI-e

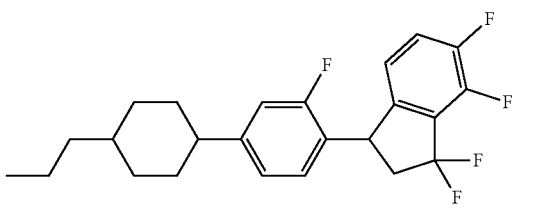

Chemical Formula PI-f

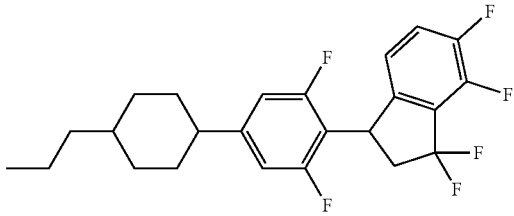

In Chemical Formula PI-a above, a refractive index (Δn) is about 0.08 and a dielectric anisotropy (Δ∈) is about 15.4. In Chemical Formula PI-b above, a refractive index (Δn) is about 0.09 and a dielectric anisotropy (Δ∈) is about 16.0. In Chemical Formula PI-c above, a refractive index (Δn) is about 0.13 and a dielectric anisotropy (Δ∈) is about 16. In Chemical Formula PI-d above, a refractive index (Δn) is about 0.16 and a dielectric anisotropy (Δ∈) is about 16.8. In Chemical Formula PI-e above, a refractive index (Δn) is about 0.15 and a dielectric anisotropy (Δ∈) is about 14.4. In Chemical Formula PI-f above, a refractive index (Δn) is about 0.17 and a dielectric anisotropy (Δ∈) is about 15.5.

At least one of the polar liquid crystal compounds represented by Chemical Formulas PI-1 to PI-4 may be included in a content of about 1 to 10 wt % based on an entire content of the liquid crystal composition.

The liquid crystal composition according to the present exemplary embodiment may further include an antioxidant. The antioxidant may prevent oxidation of the alkenyl-based compound or the alkoxy-based compound which may occur during or after the manufacturing process of the liquid crystal display without deteriorating the light characteristic of the liquid crystal display according to an exemplary embodiment of the present inventive concept to be described below. That is, the antioxidant may prevent a primary oxidation of the alkenyl-based compound, and the alkoxy-based compound by light, heat, and/or an initiator.

The antioxidant according to the present exemplary embodiment may be at least any one selected from the group consisting of alkylated monophenol, alkylthio methyl phenol, hydroquinone and alkylated hydroquinone, tocopherol, hydroxylated thiodiphenyl ether, alkylidene bisphenol, O—, N- and S-benzyl compound, hydroxy-benzylated malonate, aromatic hydroxybenzyl compound, benzylphosphonate, acylamino phenol, monovalent or polyvalent alcohol, ester of monovalent or polyvalent alcohol with β-(3,5-di-tert-butyl-4-hydroxyphenyl)-propionic acid, ester of monovalent or polyvalent alcohol with β-(5-tert-butyl-4-hydroxy-3-methylphenyl)-propionic acid, ester of monovalent or polyvalent alcohol with β-(3,5-dicyclohexyl-4-hydroxyphenyl)-propionic acid, ester of monovalent or polyvalent alcohol with 3,5-di-tert-butyl-4-hydroxyphenyl acetic acid, amide of β-(3,5-di-tert-butyl-4-hydroxyphenyl) propionic acid, ascorbic acid, and an amine antioxidant.

Hereinafter, the liquid crystal display manufactured by using the liquid crystal composition described above will be described.

Figure 2:
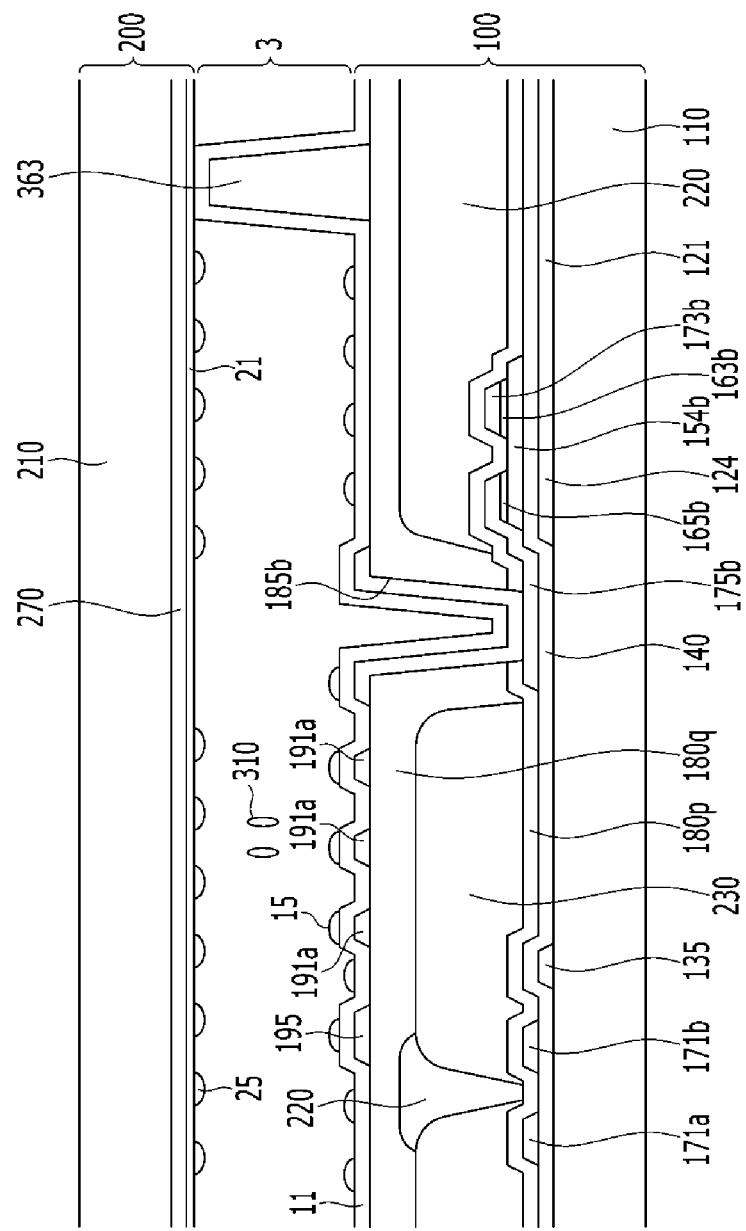
FIG. 2 is a cross-sectional view taken along line II-II of FIG. 1.

FIG. 1 is a top plan view of the liquid crystal display according to an exemplary embodiment of the present inventive concept. FIG. 2 is a cross-sectional view taken along line II-II of FIG. 1.

Referring to FIGS. 1 and 2, the liquid crystal display according to an exemplary embodiment of the present inventive concept includes a lower display panel 100 and an upper display panel 200 facing each other, and a liquid crystal layer 3 between these two display panels 100 and 200.

First, a lower display panel 100 is described.

A plurality of gate lines 121 and a plurality of storage electrode lines 131 and 135 are positioned on a first substrate 110 which is an insulation substrate.

The gate line 121 transfers a gate signal and is mainly extended in a horizontal direction. The gate line 121 includes a wide end portion (not shown) for allowing a connection with other layers or external driving circuits. The gate line 121 may be formed of aluminum-based metals such as aluminum (Al), aluminum alloy, and the like, silver-based metals such as silver (Ag), silver alloy, and the like, copper-based metals such as copper (Cu), copper alloy, and the like, molybdenum-based metals such as molybdenum (Mo), molybdenum alloy, and the like, chromium (Cr), tantalum (Ta), titanium (Ti), and the like. However, the gate line 121 may have a multilayer structure including at least two conductive layers having different physical properties. Each gate line 121 may include a plurality of first and second gate electrodes 124a and 124b which protrude from the gate line 121.

The storage electrode lines 131 and 135 include a stem line 131 extended to be substantially parallel to the gate line 121 and a plurality of storage electrodes 135 extended from the stem line.

Shapes and disposition of the storage electrode lines 131 and 135 may be changed in various types.

A gate insulation layer 140 is formed on the gate line 121 and the storage electrode lines 131 and 135, and a plurality of semiconductor layers 154a and 154b formed of amorphous, crystalline silicon, or the like are positioned on the gate insulation layer 140.

A plurality of pairs of ohmic contacts may be formed on the semiconductor layers 154a and 154b, respectively. Even though only the ohmic contacts 163b and 165b positioned on the second semiconductor layer 154b are shown as an example of the plurality of pairs of ohmic contacts in FIG. 2, the ohmic contacts may also be formed on the first semiconductor layer 154a, and the like. The ohmic contacts 163b and 165b may be formed of an n+ hydrogenated amorphous silicon in which silicide or n-type impurities are doped at a high concentration.

A plurality of pair of data lines 171a and 171b and a plurality of pair of first and second drain electrodes 175a and 175b are positioned on the ohmic contacts 163b and 165b and the gate insulation layer 140.

The data lines 171a and 171b transfer a data signal and are mainly extended in a vertical direction to be overlapped with the gate line 121 and the stem line 131 of the storage electrode line. The data lines 171a and 171b are extended toward the first and second gate electrodes 124a and 124b and are connected to first and second source electrodes 173a and 173b bent in a U shape, and the first and second source electrodes 173a and 173b face the first and second drain electrodes 175a and 175b based on the first and second gate electrodes 124a and 124b.

The first and second drain electrodes 175a and 175b are extended upwardly from one side end partially surrounded by the first and second source electrodes 173a and 173b, respectively, and an opposite side end thereof may have large area for connection with other layers.

However, shapes and disposition of the first and second source electrodes 173a and 173b, the first and second drain electrodes 175a and 175b, and the data lines 171a and 171b may be changed in various types.

The first gate electrode 124a, the first source electrode 173a and the first drain electrode 175a form a first thin film transistor (TFT) together with the first semiconductor layer 154a, the second gate electrode 124b, the second source electrode 173b and the second drain electrode 175b form a second thin film transistor together with the second semiconductor layer 154b, and a channel of the first thin film transistor is formed in the first semiconductor layer 154a between the first source electrode 173a and the first drain electrode 175a, and a channel of the second thin film transistor is formed in the second semiconductor layer 154b between the second source electrode 173b and the second drain electrode 175b.

The ohmic contacts 163b and 165b are present only between the semiconductor layer 154b below the ohmic contacts, and the data lines 171a and 171b and the drain electrodes 175a and 175b above the ohmic contacts to thereby decrease contact resistance therebetween. The semiconductor layers 154a and 154b have parts between the source electrodes 173a and 173b and the drain electrodes 175a and 175b, which are not covered by the source electrodes 173a and 173b and the drain electrodes 175a and 175b but are exposed.

A lower passivation layer 180p formed of silicon nitride or silicon oxide is positioned on the data lines 171a and 171b, the source electrodes 173a and 173b, the drain electrodes 175a and 175b and the exposed parts of the semiconductor layers 154a and 154b.

A color filter 230 is positioned on the lower passivation layer 180p. The color filter 230 may uniquely display one of primary colors, and examples of the primary colors may include three primary colors such as red, green, blue, and the like, or yellow, cyan, magenta, and the like. Although not shown, the color filter may further include a color filter displaying a mixed color of the primary colors or white, in addition to the primary colors. A light blocking member 220 formed of a single layer or a double layer of chromium and chromium oxide or organic materials is positioned on the color filter 230. The light blocking member 220 has openings arranged in a matrix form.

An upper passivation layer 180q formed of transparent organic insulation materials is formed on the color filter 230 and the light blocking member 220. The upper passivation layer 180q prevents the color filter 230 from being exposed and provides a flat surface. A plurality of contact holes 185a and 185b exposing the first and second drain electrodes 175a and 175b are formed in the lower passivation layer 180p and the upper passivation layer 180q.

A plurality of pixel electrodes 191 are positioned on the upper passivation layer 180q. The pixel electrode 191 may be formed of transparent conductive materials such as ITO, IZO, and the like, or reflective metals such as aluminum, silver, chromium, alloys thereof, and the like.

Figure 4:
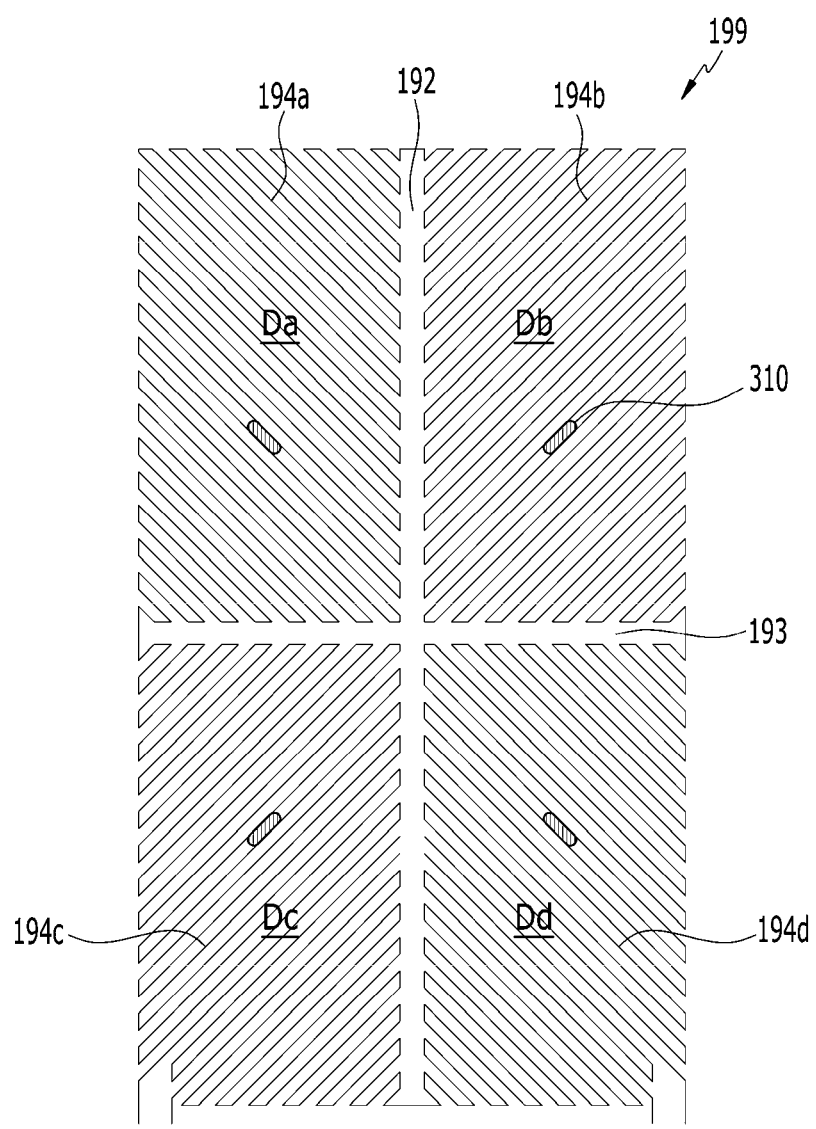
FIG. 4 is a top plan view of a base electrode of the liquid crystal display according to an exemplary embodiment of the present inventive concept.

Respective pixel electrodes 191 include first and second sub-pixel electrodes 191a and 191b separated from each other, and the first and second sub-pixel electrodes 191a and 191b include at least one base electrode 199 shown in FIG. 4 or a modification thereof, respectively.

A structure of the pixel electrode 191 will be described with reference to FIGS. 3 and 4 later.

Now, the upper display panel 200 is described.

In the upper display panel 200, the common electrode 270 is formed on a front surface of the second substrate 210 which is a transparent insulation substrate. Although both the color filter 230 and the light blocking member 220 are positioned in the lower display panel 100 in the present exemplary embodiment, one or all of the color filter 230 and the light blocking member 220 may be formed in the upper display panel 200.

Column spacers 363 for maintaining an interval between the upper display panel 200 and the lower display panel 100 are formed.

The reactive mesogen according to the present exemplary embodiment may include a polymerizable group, and may form a pre-tilt by irradiation of ultraviolet rays in a state in which an electric field is applied, to improve a response time. In the present exemplary embodiment, the reactive mesogen may be one of compounds represented by Chemical Formulas RM-1 to RM-6 below, but the present inventive concept is not limited thereto:

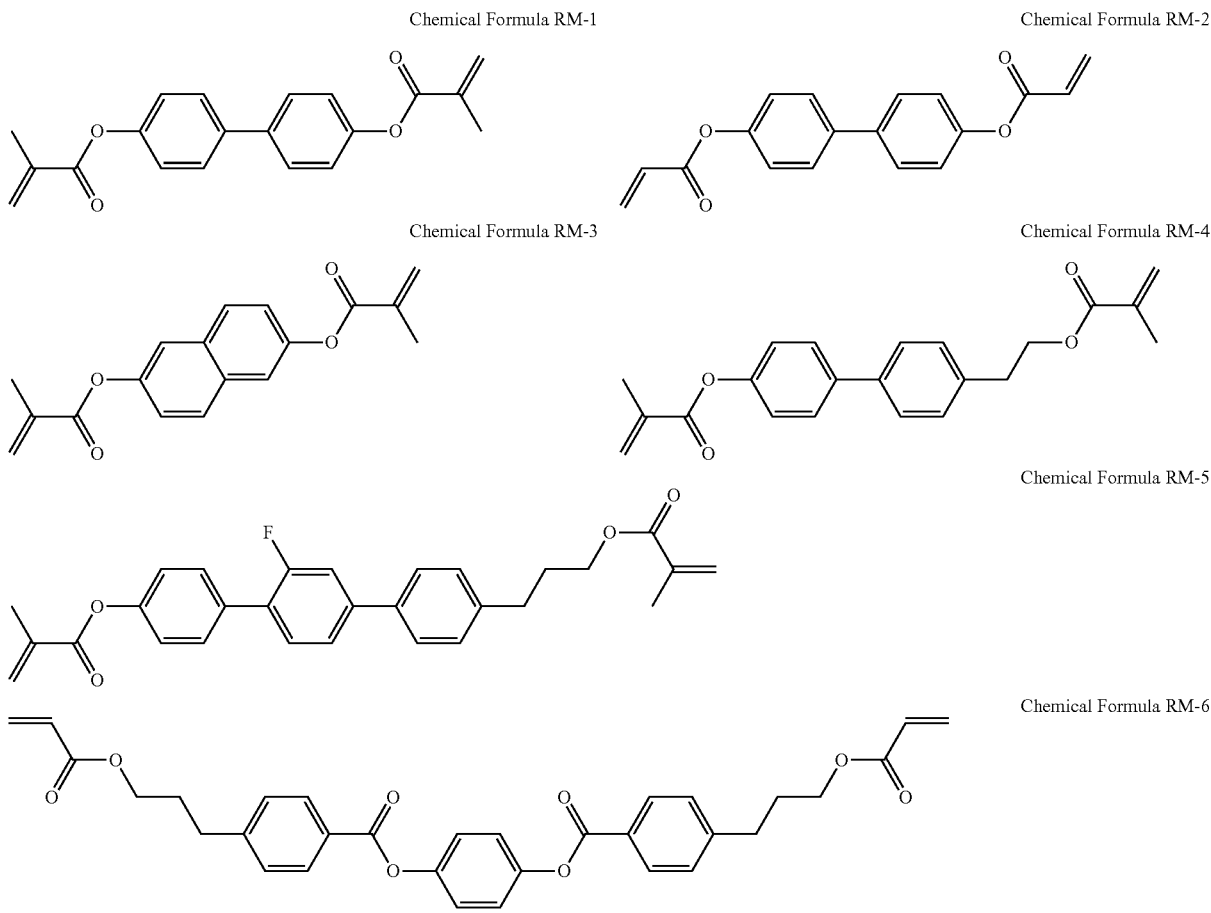

The alignment layers 11 and 21 are formed in inner side surfaces of the lower display panel 100 and the upper display panel 200. The alignment layers 11 and 21 may be vertical alignment layers. The alignment layers 11 and 21 include a main chain and side chains connected to the main chain, and the main chain includes polyimide and the side chain includes a vertical alignment group.

In the present exemplary embodiment, the lower alignment layer 11 may cover the column spacer 363 at a substantially uniform thickness.

In the present exemplary embodiment, surfaces of the alignment layers 11 and 21 are formed with protrusions 15 and 25. The protrusions 15 and 25 may be formed by light irradiating reactive mesogen which is an alignment aid included in the liquid crystal layer 3. In the present exemplary embodiment, the protrusions 15 and 25 include the alignment polymer having a pre-tilt. The alignment polymer may be formed by light irradiating reactive mesogen mixed in the liquid crystal layer 3.

In addition, polarizer (not shown) may be provided on outer side surfaces of the lower display panel 100 and the upper display panel 200.

Referring to FIGS. 1 and 2 again, the liquid crystal layer 3 including liquid crystal materials 310, the photoinitiator and the alignment aid is interposed between the lower display panel 100 and the upper display panel 200.

The liquid crystal materials 310 include a neutral liquid crystal compound and a polar liquid crystal compound. The liquid crystal layer 3 according to the present exemplary embodiment may be formed by the liquid crystal composition as described above. In other words, descriptions of the liquid crystal material 310, the photoinitiator, and the alignment aid which are the same as described above may be applied to the present exemplary embodiment. The liquid crystal materials 310 have a negative dielectric anisotropy, and may be aligned so that a major axis thereof is nearly vertical (perpendicular) to the surfaces of the two display panels 100 and 200 in a state in which an electric field is not applied.

The alignment polymer included in the protrusions 15 and 25 and formed by light irradiating the reactive mesogen serves to control pre-tilt which is an initial alignment direction of the liquid crystal material 310. In this case, the photoinitiator included in the liquid crystal layer 3 promotes a polymerization reaction in which the alignment polymer is formed by light irradiating the reactive mesogen according to the present exemplary embodiment, such that the protrusions 15 and 25 may be formed.

Figure 3:
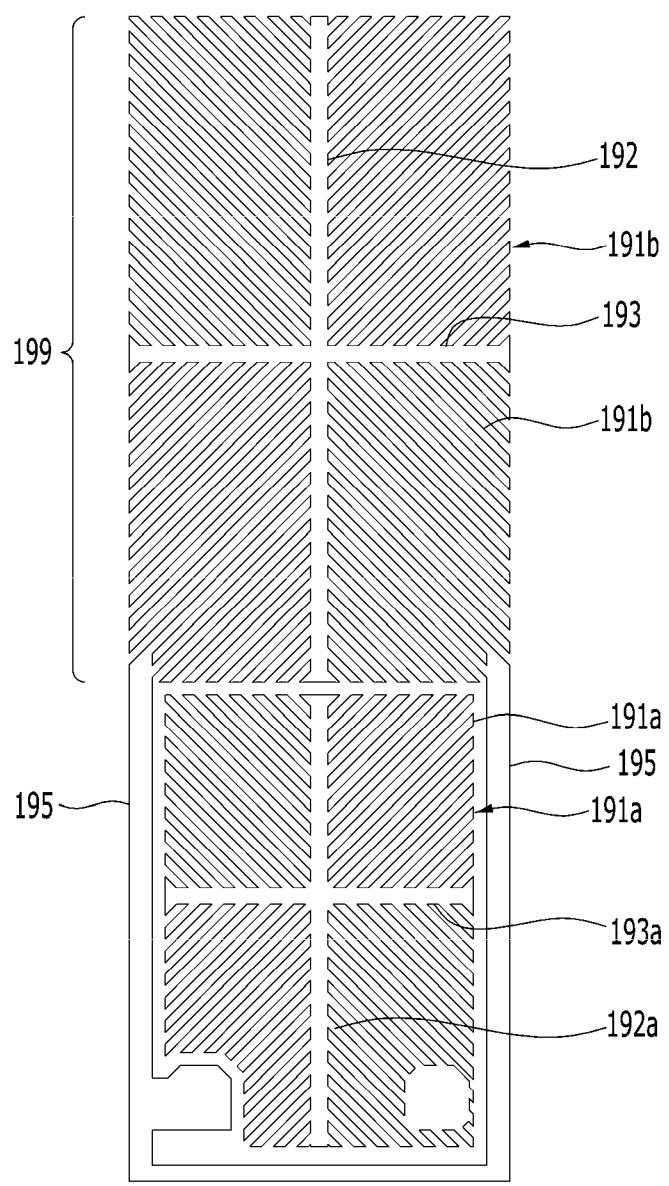
FIG. 3 is a top plan view of a pixel electrode according to an exemplary embodiment of the present inventive concept.

FIG. 3 is a top plan view of the pixel electrode according to an exemplary embodiment of the present inventive concept. FIG. 4 is a top plan view of a base electrode of the liquid crystal display according to an exemplary embodiment of the present inventive concept.

Now, referring to FIGS. 3 and 4, the base electrode 199 is described in detail.

As shown in FIG. 4, the base electrode 199 has an overall shape of a quadrangle, and includes a cross stem portion including a horizontal stem portion 193 and a vertical stem portion 192 orthogonal to the horizontal stem portion. In addition, the base electrode 199 includes a first sub-region (Da), a second sub-region (Db), a third sub-region (Dc), and a fourth sub-region (Dd) which are classified based on the horizontal stem portion 193 and the vertical stem portion 192, and each sub-region (Da to Dd) includes a plurality of first to fourth fine branched portions 194a, 194b, 194c and 194d.

The first fine branched portions 194a are obliquely extended in a left upper direction from the horizontal stem portion 193 or the vertical stem portion 192, and the second fine branched portions 194b are obliquely extended in a right upper direction from the horizontal stem portion 193 or the vertical stem portion 192. In addition, the third fine branched portions 194c are obliquely extended in a left lower direction from the horizontal stem portion 193 or the vertical stem portion 192, and the fourth fine branched portions 194d are obliquely extended in a right lower direction from the horizontal stem portion 193 or the vertical stem portion 192.

The first to fourth fine branched portions 194a, 194b, 194c, 194d form an angle of approximately 45 or 135 degrees with the gate line 121 (FIG. 1) or the horizontal stem portion 193. In addition, the fine branched portions 194a, 194b, 194c, and 194d of the two neighboring sub-regions (Da, Db, Dc, and Dd) may be orthogonal to each other.

The fine branched portions 194a to 194d may have a width of 2.0 μm to 5.0 μm, and an interval between the neighboring fine branched portions 194a to 194d in one sub-region (Da to Dd) may be 2.5 μm to 5.0 μm.

Although not shown, a width of the fine branched portions 194a, 194b, 194c, and 194d may be wider closer to the horizontal stem portion 193 or the vertical stem portion 192 and taper to become narrower as a distance from the horizontal stem portion 193 or the vertical stem portion 192 increases.

Referring to FIGS. 1 to 3, first and second sub-pixel electrodes 191a and 191b include one base electrode 199, respectively. For example, FIG. 4 depicts the base electrode 199 based on the first sub-pixel electrode 191a. But, the base electrode 199 may be deformed based on the second sub-pixel electrode 191b. An area occupied by the second sub-pixel electrode 191b in the entire area of the pixel electrode 191 may be larger than an area occupied by the first sub-pixel electrode 191a, wherein the second sub-pixel electrode 191b may have an area 1.0 to 2.2 times larger than that of the first sub-pixel electrode 191a, such that the base electrodes 199 have different sizes.

The second sub-pixel electrode 191b includes a pair of branches 195 extended along the data line 171. The pair of branches 195 are positioned between the first sub-pixel electrode 191a and the date lines 171a and 171b, and are connected to each other at a lower end of the first sub-pixel electrode 191a. The first and second sub-pixel electrodes 191a and 191b may be physically and electrically connected to the first and second drain electrodes 175a and 175b through the contact holes 185a and 185b, and a data voltage is received from the first and second drain electrodes 175a and 175b.

When a voltage is applied to the pixel electrode 191 and the common electrode 270, the direction that the major axis of the liquid crystal material 310 is oriented changes, so that the major axis thereof is vertical (perpendicular) to the direction of an electric field in response to the electric field formed between the pixel electrode 191 and the common electrode 270. The degree that polarization of an incident light on the liquid crystal layer 3 is changed may differ depending on the tilted degrees of the liquid crystal materials 310, and the change of the polarization is shown as a change in transmittance by a polarizer, and the liquid crystal display displays an image through the change in transmittance.

A direction in which the liquid crystal materials 310 are tilted is determined by the fine branched portions 194a, 194b, 194c, and 194d of the pixel electrode 191, and the liquid crystal materials 310 are tilted in a direction parallel to a length direction of the fine branched portions 194a, 194b, 194c, 194d. Because one pixel electrode 191 includes four sub-regions (Da, Db, Dc and Dd) in which length directions of the fine branched portions 194a, 194b, 194c, and 194d, are different from each other, there are approximately four directions in which the liquid crystal materials 310 are tilted, and four different domains each having different alignment direction of the liquid crystal materials 310 are formed in the liquid crystal layer 3. A viewing angle of the liquid crystal display may be improved by variously changing the direction in which the liquid crystal molecules are tilted.

The above-description of the thin film transistor and the pixel electrode 191 is one example, and a structure of the thin film transistor and a design of the pixel electrode may be modified to improve a side visibility. For example, an RD-TFT (Resistivity Division-thin film transistor) structure capable of improving visibility may be formed by using a voltage differential effect generated for each region according to distribution of resistance.

Figure 5:
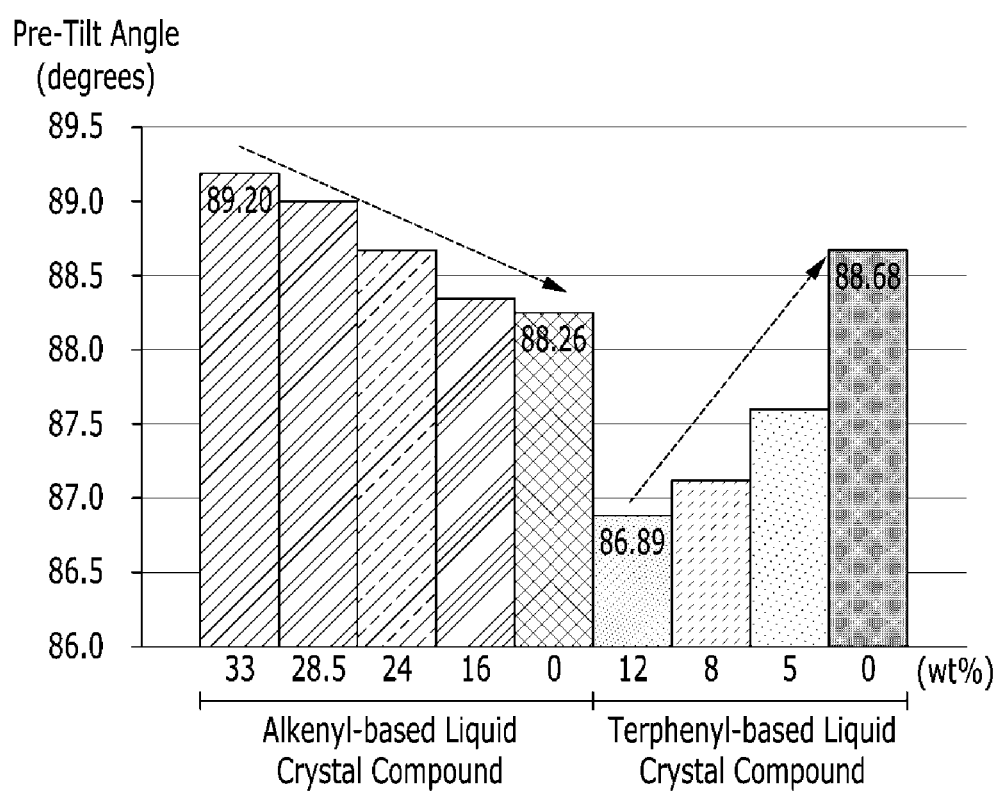
FIG. 5 is a graph showing degrees of pre-tilt angles according to liquid crystal compositions including alkenyl-based liquid crystal compounds.

FIG. 5 is a graph showing degrees of the pre-tilt angles according to the liquid crystal compositions including the alkenyl-based liquid crystal compounds.

Referring to FIG. 5, as the content of the alkenyl-based liquid crystal compound is increased to be 16 wt %, 24 wt %, 28.5 wt % or 33 wt % (based on the total weight of the liquid crystal composition), the pre-tilt angle increases. The pre-tilt angle may be defined as an angle at which the liquid crystal materials are tilted based on 90 degrees at which the liquid crystal materials are vertically aligned, and as the pre-tilt angle is decreased based on 90 degrees, the reactivity of the reactive mesogen may be increased. Therefore, as the content of the alkenyl-based liquid crystal compound is increased, the reactivity of the reactive mesogen is decreased. A representative example of the alkenyl-based liquid crystal compound may be a compound represented by Chemical Formula G-1 below, and in Chemical formula G-1 below, X includes one C1-C5 alkyl group:

Chemical Formula G-1

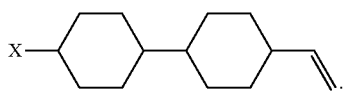

Figure 6:
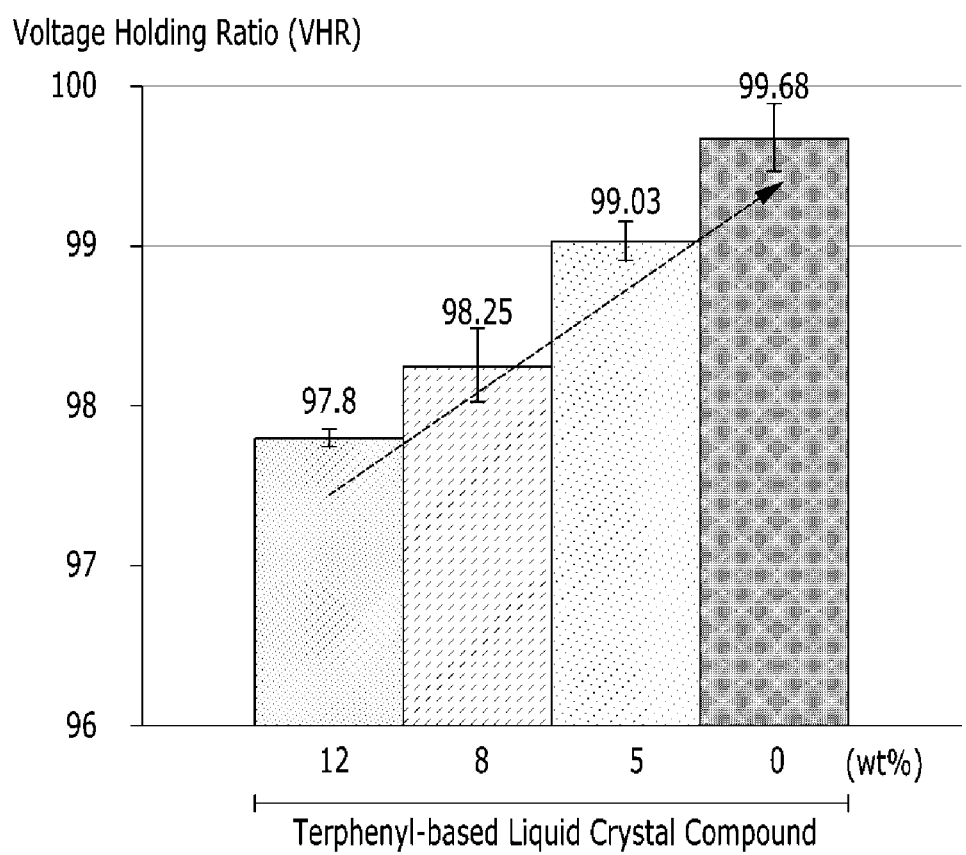
FIG. 6 is a graph showing voltage holding ratios according to liquid crystal compositions including terphenyl-based liquid crystal compounds.

FIG. 6 is a graph showing voltage holding ratios according to the liquid crystal compositions including the terphenyl-based liquid crystal compounds.

Referring to FIG. 6, as the content of the terphenyl-based liquid crystal compound is decreased to be 12 wt %, 8 wt %, 5 wt % or 0 wt % (based on the total weight of the liquid crystal composition), the voltage holding ratio becomes increased. Here, the alkenyl-based liquid crystal compound has uniformly maintained content of 24 wt % (based on the total weight of the liquid crystal composition).

A representative example of the terphenyl-based liquid crystal compound may be a compound represented by Chemical Formula G-10 below, and in Chemical formula G-10 below, X and Y each independently include one C1-C5 alkyl group.

Chemical Formula G-10

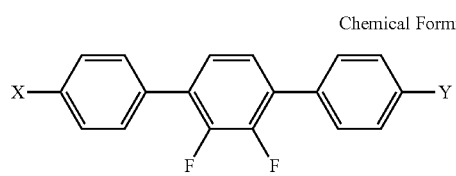

The pre-tilt angles and voltage holding ratios measured in FIGS. 5 and 6 were summarized in Table 1 below.

TABLE 1

| Alkenyl-based Liquid Crystal Compound (wt %) | 33 | 28.5 | 24 | 16 | 0 | 24 | 24 | 24 | 24 |
|---|---|---|---|---|---|---|---|---|---|
| Terphenyl-based Liquid Crystal Compound (wt %) | — | — | — | — | — | 12 | 8 | 5 | 0 |
| Pre-tilt Angle (°) | 89.20 | 89.00 | 88.68 | 88.36 | 88.26 | 86.89 | 87.13 | 87.61 | 88.68 |
| Voltage Holding Ratio (%) | — | — | — | — | — | 97.80 | 98.25 | 99.03 | 99.68 |

Hereinafter, degrees of reactivity of the reactive mesogen and a difference in the pre-tilt angles depending on the content of the photoinitiator according to an exemplary embodiment of the present inventive concept are described with reference to Table 2 below.

TABLE 2

| Content (ppm) of Photoinitiator | 0 | 50 | 100 | 200 |
|---|---|---|---|---|
| Average Surface Roughness (nm) | 5.6 | 6.6 | 8.1 | 10.3 |
| Pre-tilt Angle (°) | 88.6 | 88.2 | 87.8 | 87.2 |

In Table 2, the liquid crystal displays were manufactured by using liquid crystal compositions including the alkenyl-based liquid crystal compound in a content of 20 wt % (based on the total weight of the liquid crystal composition) without including the terphenyl-based liquid crystal compound. Here, as the content of the photoinitiator included in the liquid crystal composition was increased to be 0, 50 ppm, 100 ppm, or 200 ppm, a size and an average surface roughness (nanometer unit) of the protrusions formed on the surface of the alignment layer gradually increased. The increase of the protrusion is because the reactivity of the reactive mesogen is increased. As the reactivity of the reactive mesogen is improved, the pre-tilt angle is decreased based on 90 degrees.

The voltage holding ratio may be increased by decreasing the content of the terphenyl-based liquid crystal compound or removing the terphenyl-based liquid crystal compound in the liquid crystal display using the liquid crystal composition according to the present exemplary embodiment, and the decrease in the reactivity of the reactive mesogen caused by the decreased or removed content of the terphenyl-based liquid crystal compound may be supplemented by adding the photoinitiator.

Hereinafter, the liquid crystal composition according to an exemplary embodiment of the present inventive concept and physical properties thereof are described. Table 3 below shows liquid crystal composition according to Comparative Example 1 (wt % in Tables 3, 4 and 5 below is based on the total weight of the liquid crystal composition).

TABLE 3

| Liquid Crystal Compound | Content (wt %) |
|---|---|
|  | 15 |
| 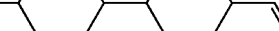 | 9 |

TABLE 3-continued

| Liquid Crystal Compound | Content (wt %) |
|---|---|
|  | 15.5 |
| 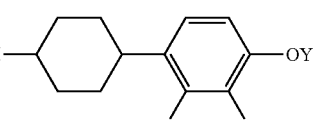 | 7 |
| 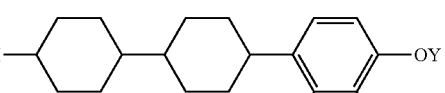 | 18 |

TABLE 3-continued

| Liquid Crystal Compound | Content (wt %) |
|---|---|
| 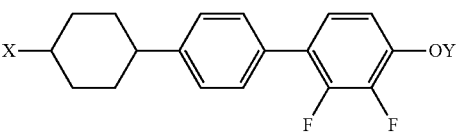 | 11.5 |
| 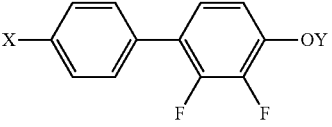 | 16 |

TABLE 3-continued

| Liquid Crystal Compound | Content (wt %) |
|---|---|
| 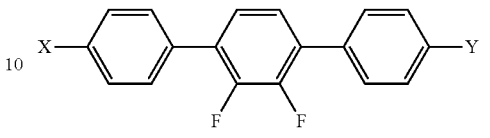 | 8 |

In Table 3, X and Y each independently includes one C1-C5 alkyl group.

Comparative Example 1 shown in Table 3 includes compounds represented by Chemical Formulas G-1, G-2, G-3, G-6, G-7, G-8, G-9, and G-10 without including compounds represented by Chemical Formulas N-1 to N-10 and Chemical Formulas NP-1 to NP-7 among the liquid crystal compounds according to an exemplary embodiment of the present inventive concept. As a result obtained by evaluating physical properties on Comparative Example 1, a refractive index (Δn) was about 0.1086, a dielectric anisotropy (Δ∈) was about −3.2, and a rotation viscosity γ1 was about 102.

TABLE 4

| Liquid Crystal Compound | Content (wt %) |
|---|---|
| 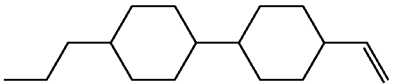 [SMILES: C=CC1CCC(C2CCC(CCC)CC2)CC1] | 20 |
| 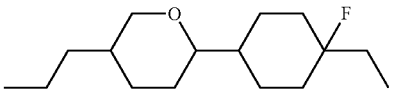 | 8 |
| 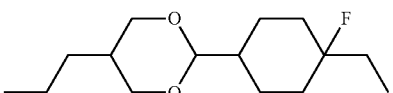 [SMILES: CCCC1CCC(C2CCC(F)(CC)CC2)OC1] | 6.5 |
| 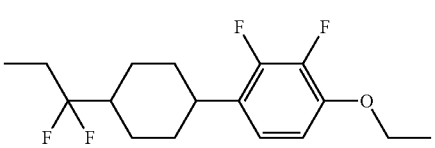 [SMILES: CCOc1ccc(C2CCC(C(F)(F)CC)CC2)c(F)c1F] | 7 |
| 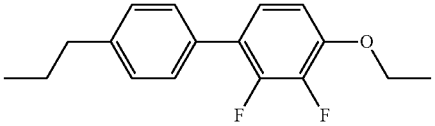 [SMILES: CCCc1ccc(-c2ccc(OCC)c(F)c2F)cc1] | 3.5 |
| 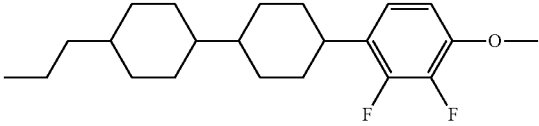 [SMILES: CCCC1CCC(C2CCC(c3ccc(OC)c(F)c3F)CC2)CC1] | 7.5 |
| 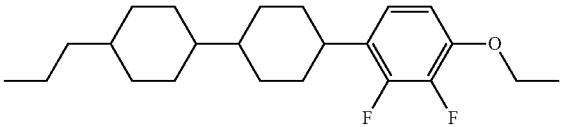 [SMILES: CCCC1CCC(C2CCC(c3ccc(OCC)c(F)c3F)CC2)CC1] | 11 |

TABLE 4-continued

| Liquid Crystal Compound | Content (wt %) |
|---|---|
| 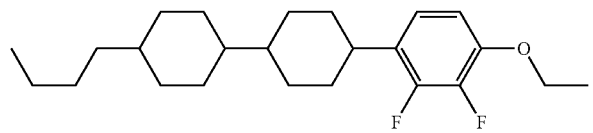 | 11 |
| 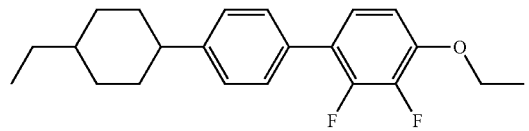 [SMILES: CCOc1ccc(-c2ccc(C3CCC(CC)CC3)cc2)c(F)c1F] | 8.5 |
| 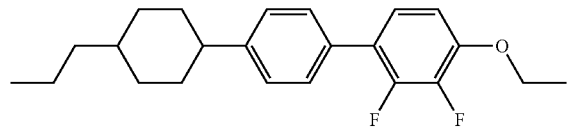 [SMILES: CCCC1CCC(c2ccc(-c3ccc(OCC)c(F)c3F)cc2)CC1] | 12 |
| 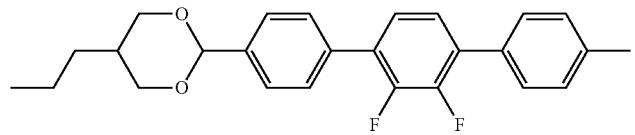 [SMILES: CCCC1COC(c2ccc(-c3ccc(-c4ccc(C)cc4)c(F)c3F)cc2)OC1] | 5 |

Example 1 shown in Table 4 includes compounds represented by Chemical Formulas N-2, N-3, NP-1 and NP-7 among the liquid crystal compositions according to an exemplary embodiment of the present inventive concept.

As a result obtained by evaluating physical properties thereof, a refractive index (Δn) was about 0.109, a dielectric anisotropy (Δ∈) was about −5.3, and a rotation viscosity γ1 was about 135. Even though the terphenyl-based compound represented by Chemical Formula G-10 included in Comparative Example 1 was omitted, the physical properties as the same as those required in existing liquid crystal composition were satisfied.

TABLE 5

| Liquid Crystal Compound | Content (wt %) |
|---|---|
| 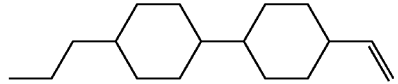 | 15 |
| 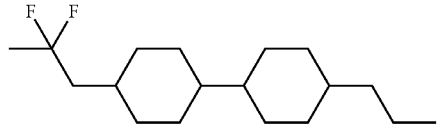 | 9 |
| 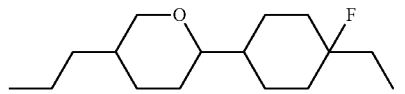 | 8 |
| 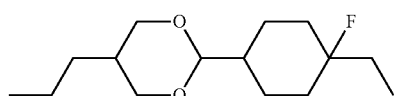 [SMILES: CCCC1CCC(C2CCC(F)(CC)CC2)OC1] | 7.5 |
| 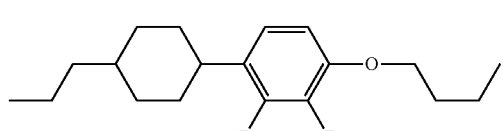 | 7 |
| 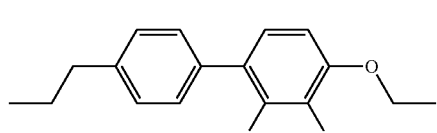 | 16 |

TABLE 5-continued

| Liquid Crystal Compound | Content (wt %) |
|---|---|
| [structure: cyclohexyl-cyclohexyl-phenyl(F,F)-OEt] | 10 |
| [structure: cyclohexyl-cyclohexyl-phenyl(F,F)-OEt with longer chain] | 8 |
| [structure: cyclohexyl-phenyl-phenyl(F,F)-OEt] | 3 |
| [structure: cyclohexyl-phenyl-phenyl(F,F)-OEt variant] | 8.5 |
| [structure: dioxane-phenyl-phenyl(F,F)-phenyl] | 8 |

Example 2 shown in Table 5 includes compounds represented by Chemical Formulas N-2, N-3, N-10 and NP-1 among the liquid crystal compositions according to an exemplary embodiment of the present inventive concept.

As a result obtained by evaluating physical properties thereof, a refractive index ($\Delta n$) was about 0.108, a dielectric anisotropy ($\Delta \in$) was about −3.0, and a rotation viscosity γ1 was about 112. Even though the terphenyl-based compound represented by Chemical Formula G-10 included in Comparative Example 1 was omitted, the physical properties as the same as those required in existing liquid crystal composition were satisfied.

Hereinafter, an exemplary embodiment of the manufacturing method of the liquid crystal display as described above will be described with reference to FIGS. 7 and 8. The exemplary embodiment to be described below may be changed and practiced into other modified exemplary embodiment of the manufacturing method.

Figure 7:
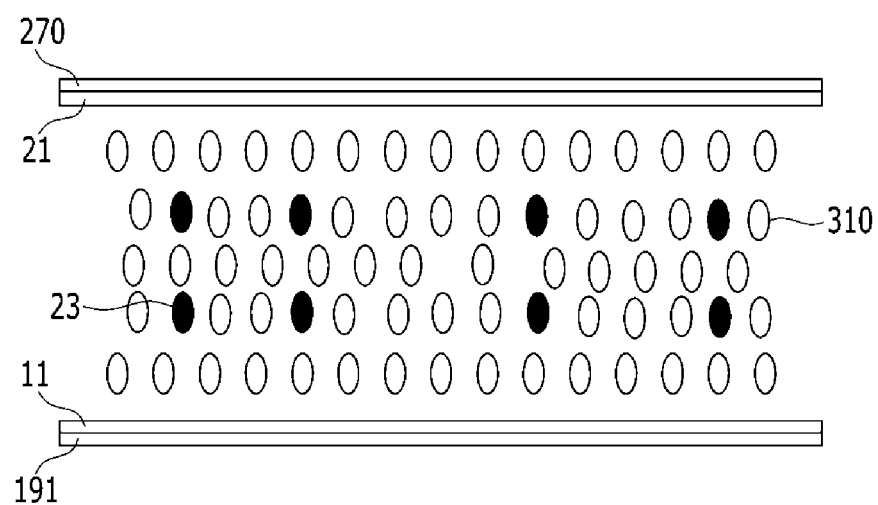
FIGS. 7 and 8 schematically show a forming method of a pre-tilt of a liquid crystal by an alignment aid according to an exemplary embodiment of the present inventive concept.
Figure 8:
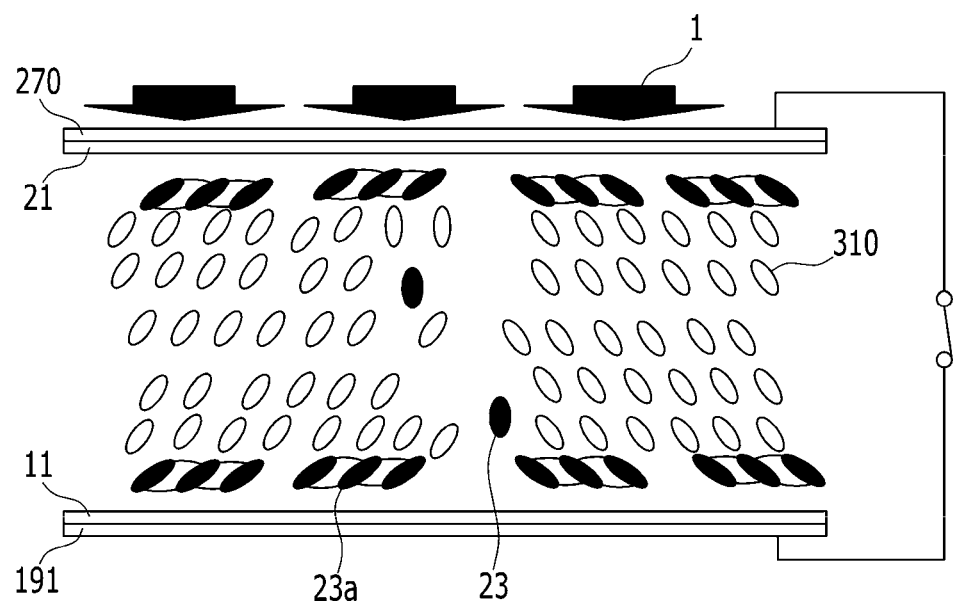

FIGS. 7 and 8 schematically show a forming method of a pre-tilt of a liquid crystal material by an alignment aid according to an exemplary embodiment of the present inventive concept.

With reference to FIGS. 1, 2 and 7, components included in each of the lower display panel 100 and the upper display panel 200 may be manufactured. In the lower display panel 100, the alignment layer 11 is formed on the pixel electrode 191 corresponding to the electric field generating electrode. Hereinafter, a method of forming the alignment layers 11 and 21 will be described.

The alignment layer 11 is formed by applying an alignment material for forming the main chain and the side chains of the alignment layer 11 on the pixel electrode 191. Similar to this, the alignment layer 21 is formed by applying the alignment material for forming the main chain and the side chains of the alignment layer 21 on the common electrode 270 facing the pixel electrode 191 and performing a bake process. The liquid crystal layer 3 including the liquid crystal materials 310, the photoinitiator (not shown) and the reactive mesogen which is the alignment aid 23 is interposed between the pixel electrode 191 and the common electrode 270.

The liquid crystal materials 310 include the neutral liquid crystal compound and the polar liquid crystal compound. The liquid crystal layer 3 according to the present exemplary embodiment may be formed by the liquid crystal composition as described above. In other words, descriptions of the liquid crystal material 310, the photoinitiator, and the alignment aid 23 may be applied to the present exemplary embodiment.

Referring to FIGS. 2 and 8, light 1 is irradiated between the pixel electrode 191 and the common electrode 270 in a state in which an electric field is applied. Unlike what is shown in the drawings, the light 1 may be irradiated with a tilt in consideration of a pre-tilt direction. Here, the alignment aid 23 may be cross-linked by photoreaction to form the alignment polymer 23a and may have a pre-tilt. Here, the photoinitiator included in the liquid crystal layer 3 assists the crosslinkage reaction of the alignment aid 23 to allow the alignment polymer 23a to be easily formed.

The alignment polymers 23a are arranged along the alignment of the liquid crystal materials, and even after the applied voltage is removed, the arrangement may be maintained to control the pre-tilt of the liquid crystal materials 310.

Figure 9:
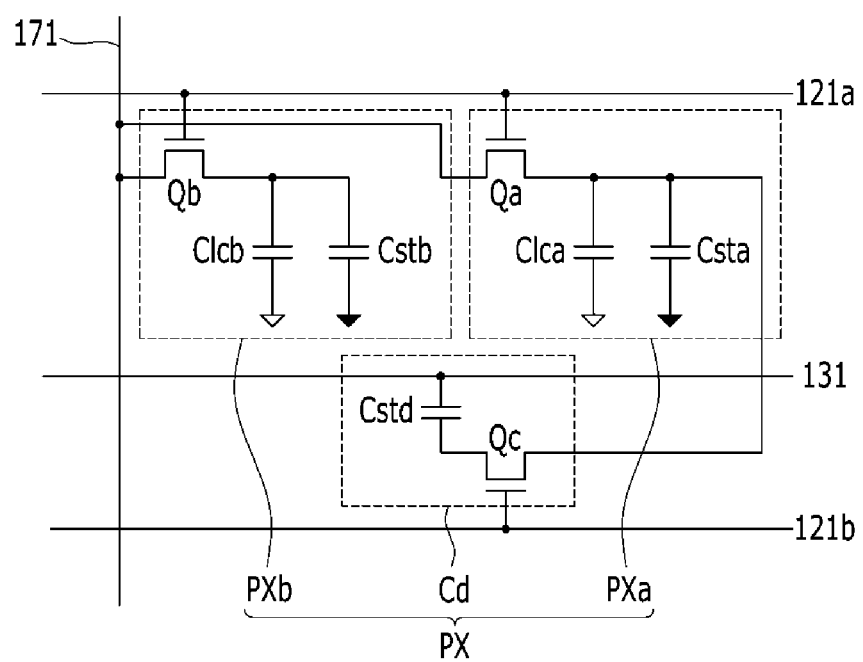
FIG. 9 is an equivalent circuit diagram of a pixel of the liquid crystal display according to an exemplary embodiment of the present inventive concept.

FIG. 9 is an equivalent circuit diagram of a pixel of the liquid crystal display according to an exemplary embodiment of the present inventive concept.

Referring to FIG. 9, a structure in view of the circuit diagram and an operation of the display device in a modified exemplary embodiment in which the thin film transistor and the pixel electrode structure of the liquid crystal display explained with reference to FIGS. 1 to 4 are modified will be described.

The liquid crystal display according to an exemplary embodiment of the present inventive concept includes signal lines including a first gate line 121a, a second gate line 121b, a storage electrode line 131 and a data line 171 and pixels PXs connected to the signal lines.

The pixel PX includes a first subpixel PXa, a second subpixel PXb and a step-down part Cd.

The first subpixel PXa includes a first switching element Qa, a first liquid crystal capacitor Clca and a first storage capacitor Csta, the second subpixel PXb includes a second switching element Qb, a second liquid crystal capacitor Clcb and a second storage capacitor Cstb, and the step-down part Cd includes a third switching element Qc and a step-down capacitor Cstd.

The first and second switching elements Qa and Qb are three terminal elements such as the thin film transistor, and the like, provided in the lower display panel, and a control terminal is connected to a first gate line 121a, an input terminal is connected to the data line 171, and an output terminal is connected to the first and second liquid crystal capacitors Clca and Clcb and the first and second storage capacitors Csta and Cstb, respectively.

The third switching element Qc is also a three terminal element of the thin film transistor, or the like, provided in the lower display panel, the control terminal is connected to the second gate line 121b, the input terminal is connected to the first liquid crystal capacitor Clca, and the output terminal is connected to the step-down capacitor Cstd.

The first and second liquid crystal capacitors Clca and Clcb are formed by overlapping the first and second sub-pixel electrodes connected to the first and second switching elements Qa and Qb, respectively, with the common electrode of the upper display panel. The first and second storage capacitors Csta and Cstb are formed by overlapping the storage electrode line 131 and the first and second sub-pixel electrodes.

The step-down capacitor Cstd is connected to the output terminal of the third switching element Qc and the storage electrode line 131, and is formed by overlapping the storage electrode line 131 provided in the lower display panel with the output terminal of the third switching element Qc with an insulator interposed therebetween.

The operation of the liquid crystal display will be described.

First, when a gate-on voltage Von is applied to the first gate line 121a, the first and second thin film transistors Qa and Qb connected to the first gate line 121a are turned on.

Accordingly, a data voltage of the data line 171b is applied to the first and second sub-pixel electrodes through the turned-on first and second switching elements Qa and Qb. The first and second liquid crystal capacitors Clca and Clcb are charged as much as a difference in the voltage between a common voltage Vcom of the common electrode and a voltage of the first and second sub-pixel electrode, such that a charging voltage of the first liquid crystal capacitor Clca and a charging voltage of the second liquid crystal capacitor Clcb are the same as each other. Here, a gate-off voltage Voff is applied to the second gate line 121b.

Then, when the gate-off voltage Voff is applied to the first gate line 121a and simultaneously the gate-on voltage Von is applied to the second gate line 121b, the first and second switching elements Qa and Qb connected to the first gate line 121a are turned off, and the third switching element Qc is turned on. Accordingly, electric charges of the first sub-pixel electrode connected to the output terminal of the first switching element Qa flow into the step-down capacitor Cstd, such that a voltage of the first liquid crystal capacitor Clca is decreased.

When explaining an example in which the liquid crystal display according to the present exemplary embodiment is operated by frame inversion, and in the present frame, a positive (+) data voltage is applied to the data line 171 based on the common voltage Vcom, after a previous frame is completed, negative (−) charges are collected in the step-down capacitor (Cstd). When the third switching element Qc is turned on in the present frame, positive (+) charges of the first sub-pixel electrode 191a flow into the step-down capacitor Cstd through the third switching element Qc, such that positive (+) charges are collected in the step-down capacitor Cstd, and the voltage of the first liquid crystal capacitor Clca is decreased. In the following frame, on the contrary, the third switching element Qc is turned on in a state in which the negative (−) charges are charged to the first sub-pixel electrode 191a, such that negative (−) charges of the first sub-pixel electrode 191a flow into the step-down capacitor Cstd to collect negative (−) charges in the step-down capacitor Cstd and the voltage of the first liquid crystal capacitor Clca is also decreased.

According to the present exemplary embodiment as described above, a charge voltage of the first liquid crystal capacitor Clca may be always lower than the charge voltage of the second liquid crystal capacitor Clcb regardless of a polarity of the data voltage. Therefore, the side visibility of the liquid crystal display may be improved by allowing the charge voltage of the first and second liquid crystal capacitors Clca and Clcb to be different.

Unlike the present exemplary embodiment, the first and second switching elements Qa and Qb of the first and second sub-pixel electrodes receive different data voltages obtained from one image information through different data lines, respectively, or are connected to different gate lines to receive different data voltages obtained from one image information at different times, respectively. Otherwise, only the first sub-pixel electrode may receive the data voltage through the switching element, and the second sub-pixel electrode may receive a relatively low voltage through capacitive coupling with the first sub-pixel electrode. In various exemplary embodiments as described above, the third switching element Qc, the step-down capacitor Cstd, and the like, may be omitted.

FIG. 9 shows a modified exemplary embodiment in which the visibility structure of the exemplary embodiments of FIGS. 1 to 4 shown above is modified, and a description of the liquid crystal composition included in the liquid crystal layer which is the same as described above may be applied to the present exemplary embodiment.

Figure 10:
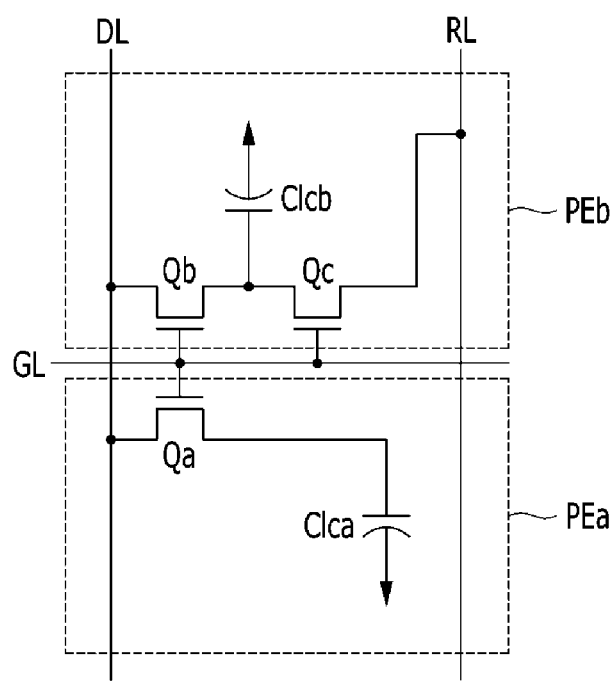
FIG. 10 is an equivalent circuit diagram of a pixel of the liquid crystal display according to an exemplary embodiment of the present inventive concept.

FIG. 10 is an equivalent circuit diagram of a pixel of the liquid crystal display according to an exemplary embodiment of the present inventive concept.

Referring to FIG. 10, a structure in view of the circuit diagram and an operation of the display device in a modified exemplary embodiment in which the thin film transistor and the pixel electrode structure of the liquid crystal display explained with reference to FIGS. 1 to 4 are modified, will be described.

Referring to FIG. 10, one pixel PX of the liquid crystal display according to an exemplary embodiment of the present inventive concept includes a gate line GL transferring a gate signal and a data line DL transferring a data signal, a plurality of signal lines including a reference voltage line RL transferring a division reference voltage, and a first switching element Qa, a second switching element Qb and a third switching element Qc connected to the plurality of signal lines, and a first liquid crystal capacitor Clca and a second liquid crystal capacitor Clcb.

The first switching element Qa and the second switching element Qb are connected to the gate line GL and the data line DL, respectively, and the third switching element Qc is connected to the output terminal and the reference voltage line RL of the second switching element Qb.

The first switching element Qa and the second switching element Qb are three terminal elements of the thin film transistor, and the like, and a control terminal is connected to the gate line GL, an input terminal is connected to the data line DL, an output terminal of the first switching element Qa is connected to the first liquid crystal capacitor Clca, and an output terminal of the second switching element Qb is connected to the second liquid crystal capacitor Clcb and an output terminal of the third switching element Qc.

The third switching element Qc is also the three terminal element of the thin film transistor, and the like, and a control terminal is connected to the gate line GL, an output terminal is connected to the second liquid crystal capacitor Clcb, and an input terminal is connected to the reference voltage line RL.

When the gate-on voltage Von is applied to the gate line GL, the first switching element Qa, the second switching element Qb and the third switching element Qc connected to the gate line are turned on. Accordingly, the data voltage applied to the data line DL is applied to the first sub-pixel electrode PEa and the second sub-pixel electrode PEb through the turned on first switching element Qa and the turned on second switching element Qb, respectively. Here, the data voltage applied to the first sub-pixel electrode PEa and the second sub-pixel electrode PEb may be charged as the same as each other. However, according to an exemplary embodiment of the present inventive concept, the voltage applied to the second sub-pixel electrode PEb is divided through the third switching element Qc connected to the second switching element Qb in series. Therefore, the voltage Vb applied to the second sub-pixel electrode PEb is smaller than the voltage Va applied to the first sub-pixel electrode PEa.

Eventually, the voltage charged to first liquid crystal capacitor Clca is different from the voltage charged to the second liquid crystal capacitor Clcb. Because the voltage charged to the first liquid crystal capacitor Clca is different from the voltage charged to the second liquid crystal capacitor Clcb, an angle at which the liquid crystal molecules are tilted in the first subpixel is different from an angle at which the liquid crystal molecules are tilted in the second subpixel, such that two subpixels have different luminance. Therefore, by appropriately controlling the voltage charged to the first liquid crystal capacitor Clca and the voltage charged to the second liquid crystal capacitor Clcb, an image from a side may be produced which is as close as possible to an image from a front, and accordingly, the side visibility may be improved.

FIG. 10 shows a modified exemplary embodiment in which the visibility structure of the exemplary embodiments of FIGS. 1 to 4 shown above is modified, and a description of the liquid crystal composition included in the liquid crystal layer which is the same as described above may be applied to the present exemplary embodiment. While this inventive concept has been described in connection with what is presently considered to be practical exemplary embodiments, it is to be understood that the inventive concept is not limited to the disclosed embodiments, but, on the contrary, is intended to cover various modifications and equivalent arrangements included within the spirit and scope of the disclosure, including the appended claims.

| <Description of symbols> | | | |
|---|---|---|---|
| 3 | liquid crystal layer | 23 | alignment aid |
| 100 | lower display panel | 200 | upper display panel |
| 121 | gate line | 140 | gate insulation layer |
| 270 | common electrode | 310 | liquid crystal material |

What is claimed is:

1. A liquid crystal composition comprising:

a photoinitiator;

an alignment aid; and a neutral liquid crystal compound comprising at least one of the compounds represented by Chemical Formulas N-1 to N-10 below:

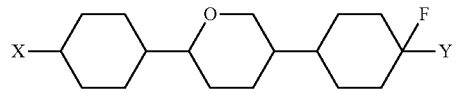

Chemical Formula N-1

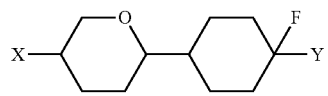

Chemical Formula N-2

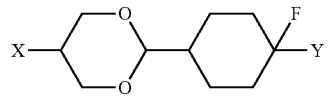

Chemical Formula N-3

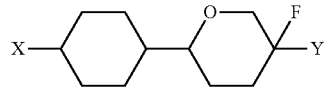

Chemical Formula N-4

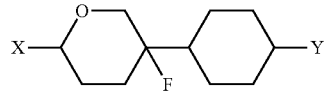

Chemical Formula N-5

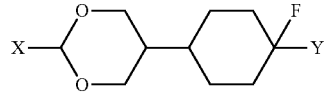

Chemical Formula N-6

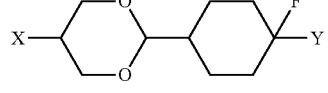

Chemical Formula N-7

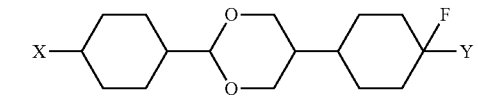

Chemical Formula N-8

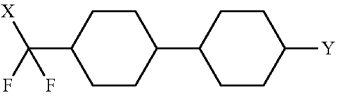

Chemical Formula N-9

-continued

Chemical Formula N-10

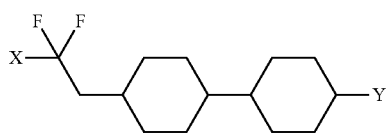

wherein in Chemical Formulas N-1 to N-10 above, X comprises one of C1-C5 alkyl groups, and Y comprises one of C1-C5 alkyl groups; and
a polar liquid crystal compound.

2. The liquid crystal composition of claim 1, wherein:
the polar liquid crystal compound comprises at least one of the compounds represented by Chemical Formulas NP-1 to NP-7 below:

Chemical Formula NP-1

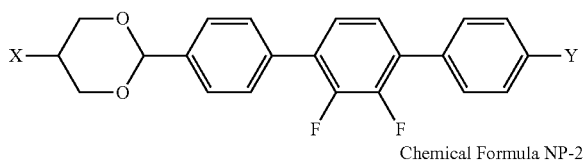

Chemical Formula NP-2

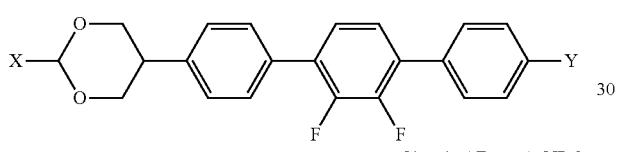

Chemical Formula NP-3

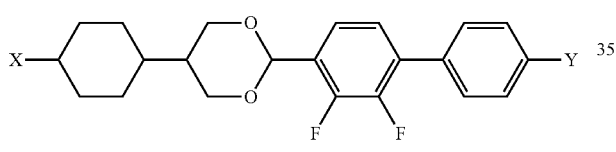

Chemical Formula NP-4

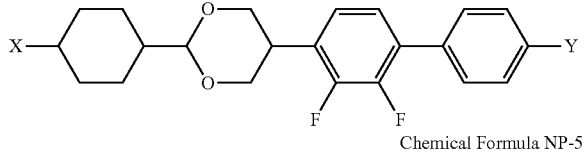

Chemical Formula NP-5

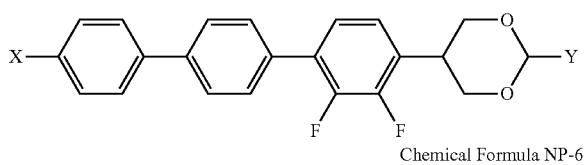

Chemical Formula NP-6

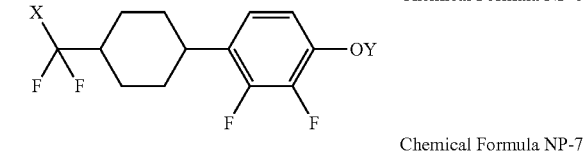

Chemical Formula NP-7

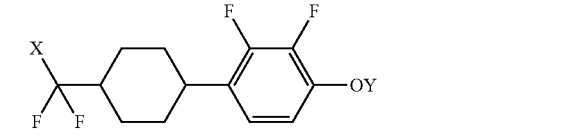

wherein in Chemical Formulas NP-1 to NP-7 above, X comprises one of C1-C5 alkyl groups, and Y comprises one of C1-C5 alkyl groups.

3. The liquid crystal composition of claim 2, further comprising:
at least one of compounds represented by Chemical Formulas G-1 to G-10 below:

Chemical Formula G-1

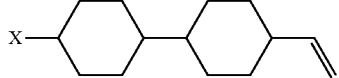

Chemical Formula G-2

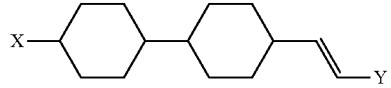

Chemical Formula G-3

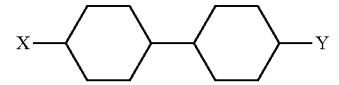

Chemical Formula G-4

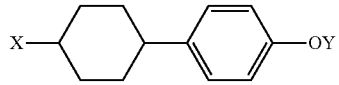

Chemical Formula G-5

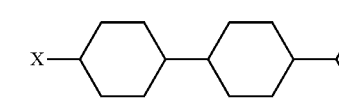

Chemical Formula G-6

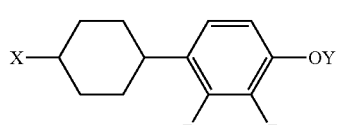

Chemical Formula G-7

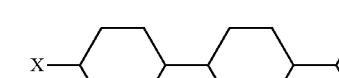

Chemical Formula G-8

Chemical Formula G-9

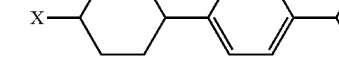

Chemical Formula G-10

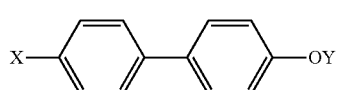

wherein in Chemical Formulas G-1 to G-10 above, X comprises one of C1-C5 alkyl groups, and Y comprises one of C1-C5 alkyl groups.

4. The liquid crystal composition of claim 2, further comprising:
at least one of the compounds represented by Chemical Formulas G-1 to G-9 below:

Chemical Formula G-1
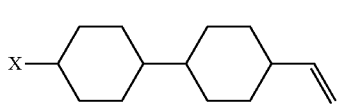

Chemical Formula G-2
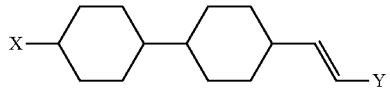

Chemical Formula G-3
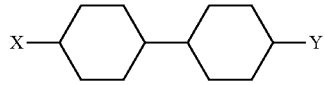

Chemical Formula G-4
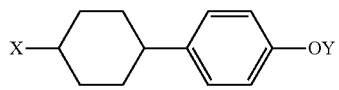

Chemical Formula G-5

Chemical Formula G-6
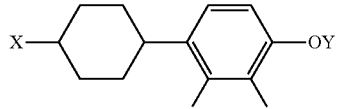

Chemical Formula G-7
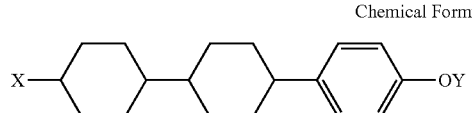

Chemical Formula G-8

Chemical Formula G-9
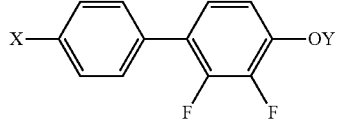

wherein in Chemical Formulas G-1 to G-9 above, X comprises one of C1-C5 alkyl group, and Y comprises one of C1-C5 alkyl group.

5. The liquid crystal composition of claim 2, further comprising:
at least one of the compounds represented by Chemical Formulas G-3 to G-10 below:

Chemical Formula G-3
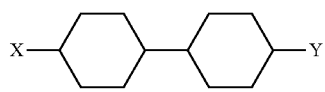

Chemical Formula G-4
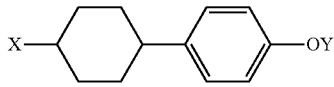

Chemical Formula G-5

Chemical Formula G-6
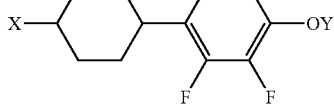

Chemical Formula G-7
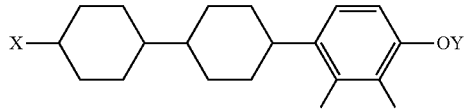

Chemical Formula G-8
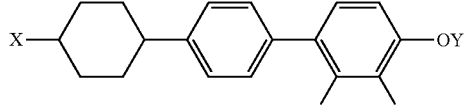

Chemical Formula G-9
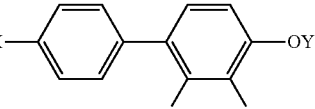

Chemical Formula G-10
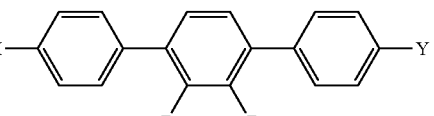

wherein in Chemical Formulas G-3 to G-10 above, X comprises one of C1-C5 alkyl groups, and Y comprises one of C1-C5 alkyl groups.

6. The liquid crystal composition of claim 3, further comprising:
at least one of the polar liquid crystal compounds represented by Chemical Formulas PI-1 to PI-4 below:

Chemical Formula PI-1
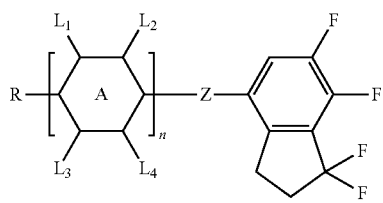

-continued

Chemical Formula PI-2

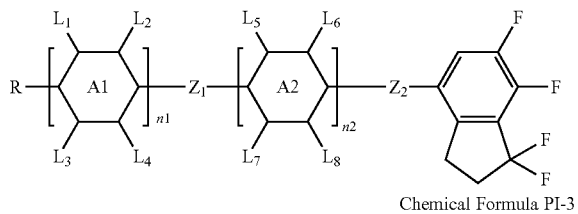

Chemical Formula PI-3

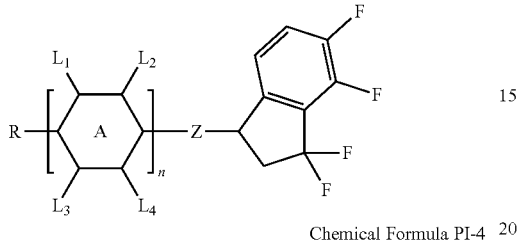

Chemical Formula PI-4

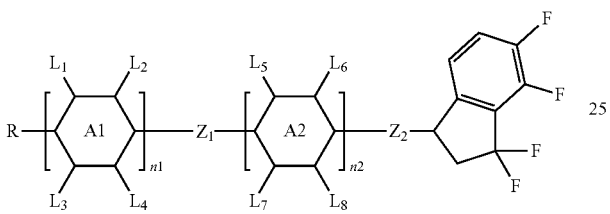

wherein in Chemical Formulas PI-1 to PI-4 above, n, n1, and n2 are 1 to 3; A, A1 and A2 each independently is one of

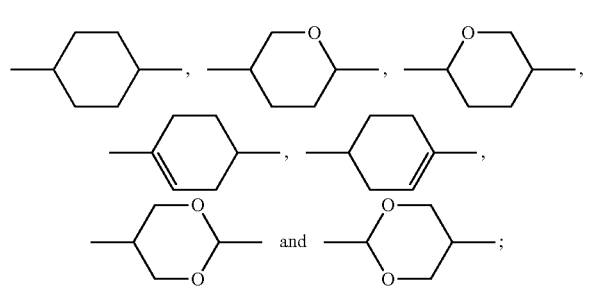

L1 to L8 each independently is H, F, Cl, $OCF_3$, $CF_3$, $CH_2F$ and $CHF_2$; Z, Z1, and Z2 each independently is —COO—, —OCO—, —$CF_2O$—, —$OCF_2$—, —$CH_2O$—, —$OCH_2$—, —$SCH_2$—, —$CH_2S$—, —$CH_2CH_2$—, —$C_2F_4$—, —$CH_2CF_2$—, —$CF_2CH_2$—, —$(CH_2)_z$- (z is 1 to 3), —CH=CH—, —CF=CF—, —CH=CF—, —CF=CH—, —C≡C— and —CH=$CHCH_2O$—, and in Chemical Formulas PI-1 to PI-4 above, each R independently comprises one of hydrogen, halogen, a cyano group and C1 to C12 alkyl groups.

7. The liquid crystal composition of claim 6, wherein:
the polar liquid crystal compounds represented by Chemical Formulas PI-1 to PI-4 above have a dielectric anisotropy (Δ∈) of 10 to 30.

8. The liquid crystal composition of claim 2, wherein:
the photoinitiator is included in a content of 0.005 wt % to 0.5 wt % (based on the total weight of the liquid crystal composition).

9. The liquid crystal composition of claim 8, wherein:
the photoinitiator has a light absorption wavelength range of 240 nanometer to 380 nanometer.

10. The liquid crystal composition of claim 2, wherein:
the alignment aid is a compound comprising a polymerization group.

11. A liquid crystal display comprising:
a first substrate;
a second substrate facing the first substrate; and
a liquid crystal layer positioned between the first substrate and the second substrate,
wherein the liquid crystal layer includes a photoinitiator, an alignment aid, a neutral liquid crystal compound, and a polar liquid crystal compound, and
the neutral liquid crystal compound comprises at least one of the compounds represented by Chemical Formulas N-1 to N-10 below:

Chemical Formula N-1

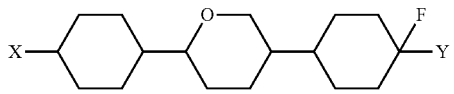

Chemical Formula N-2

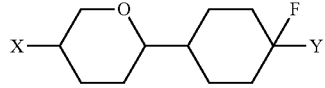

Chemical Formula N-3

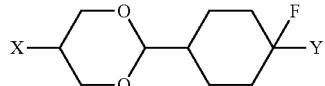

Chemical Formula N-4

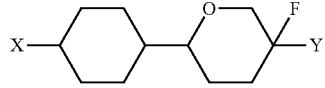

Chemical Formula N-5

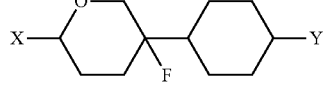

Chemical Formula N-6

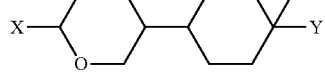

Chemical Formula N-7

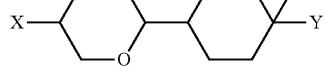

Chemical Formula N-8

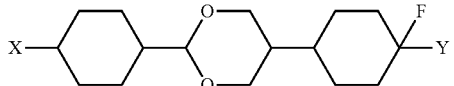

Chemical Formula N-9

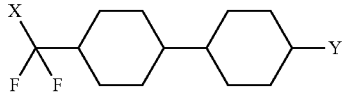

Chemical Formula N-10

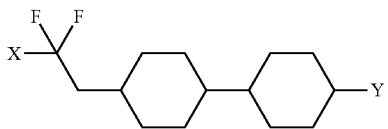

wherein in Chemical Formulas N-1 to N-10 above, X comprises one of C1-C5 alkyl groups, and Y comprises one of C1-C5 alkyl groups.

12. The liquid crystal display of claim 11, wherein:

the polar liquid crystal compound comprises at least one of the compounds represented by Chemical Formulas NP-1 to NP-7 below:

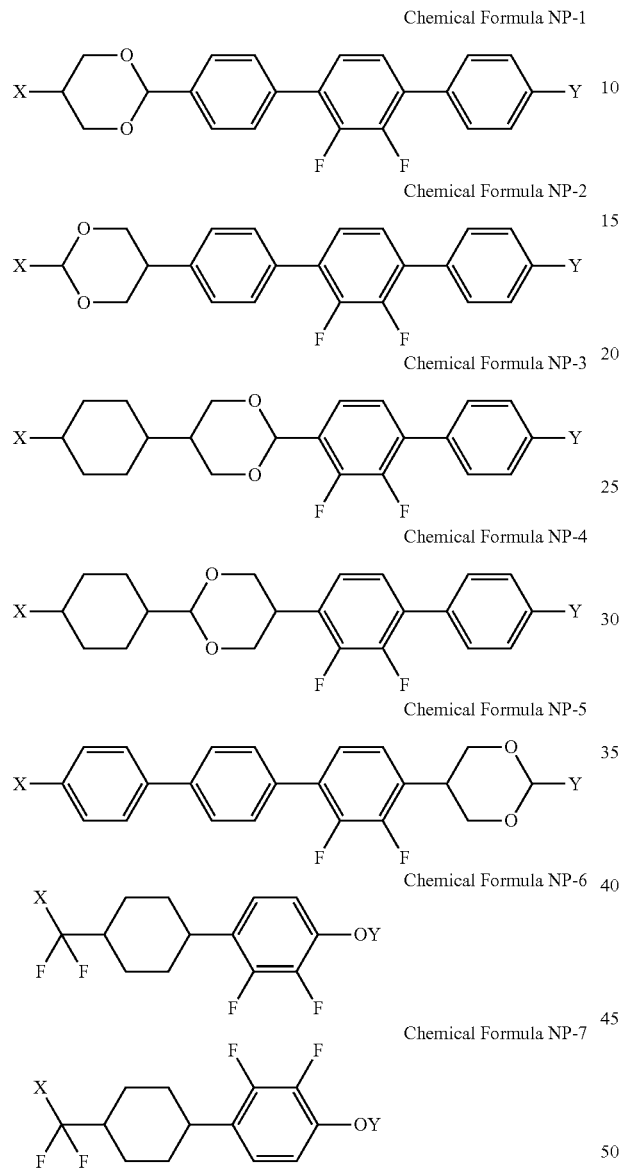

wherein in Chemical Formulas NP-1 to NP-7 above, X comprises one of C1-C5 alkyl groups, and Y comprises one of C1-C5 alkyl groups.

13. The liquid crystal display of claim 12, wherein:

the liquid crystal layer further comprises at least one of the compounds represented by Chemical Formulas G-1 to G-10 below:

Chemical Formula G-1

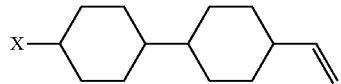

Chemical Formula G-2

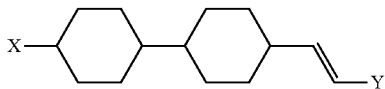

Chemical Formula G-3

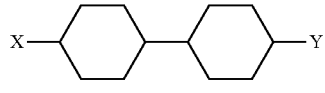

Chemical Formula G-4

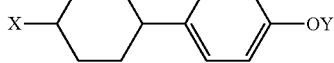

Chemical Formula G-5

Chemical Formula G-6

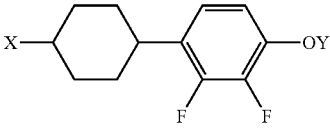

Chemical Formula G-7

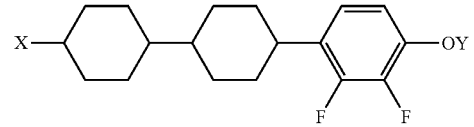

Chemical Formula G-8

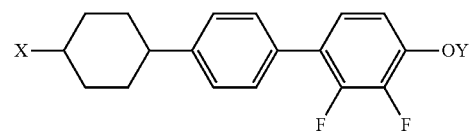

Chemical Formula G-9

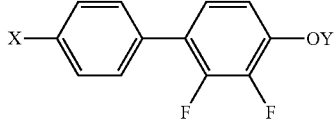

Chemical Formula G-10

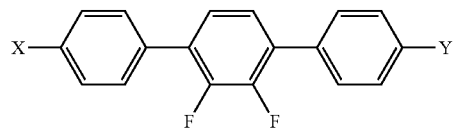

wherein in Chemical Formulas G-1 to G-10 above, X comprises one of C1-C5 alkyl groups, and Y comprises one of C1-C5 alkyl groups.

14. The liquid crystal display of claim 12, further comprising:

at least one of the compounds represented by Chemical Formulas G-1 to G-9 below:

Chemical Formula G-1

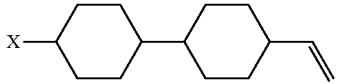

-continued

Chemical Formula G-2

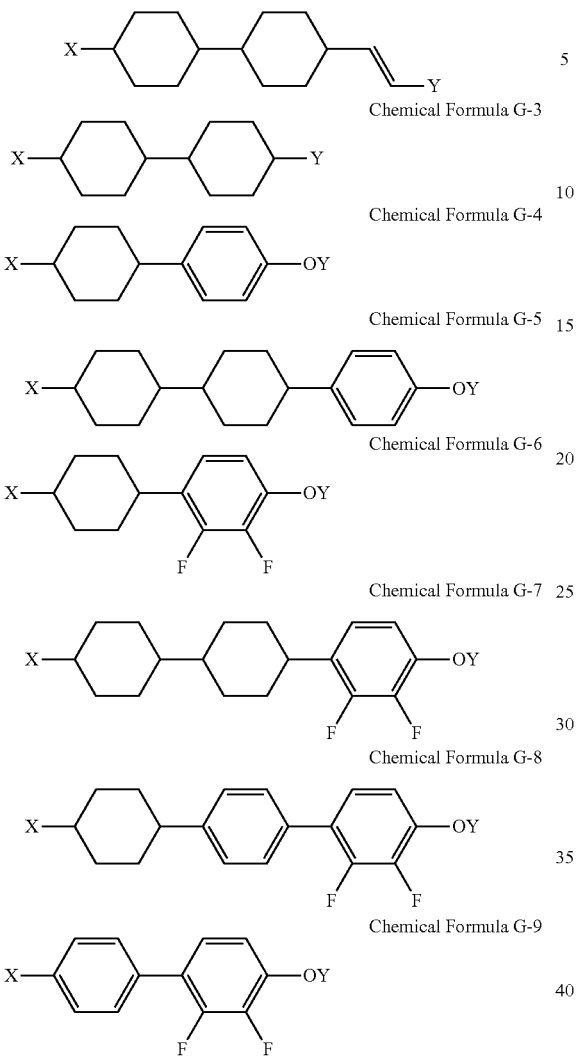

Chemical Formula G-3

Chemical Formula G-4

Chemical Formula G-5

Chemical Formula G-6

Chemical Formula G-7

Chemical Formula G-8

Chemical Formula G-9 wherein in Chemical Formulas G-1 to G-9 above, X comprises one of C1-C5 alkyl group, and Y comprises one of C1-C5 alkyl groups.

15. The liquid crystal display of claim 13, 12, further comprising:
at least one of the compounds represented by Chemical Formulas G-3 to G-10 below:

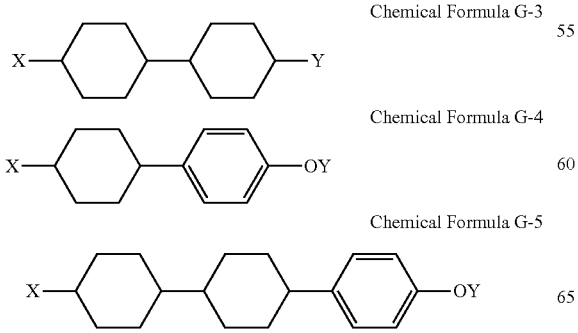

Chemical Formula G-3

Chemical Formula G-4

Chemical Formula G-5

-continued

Chemical Formula G-6

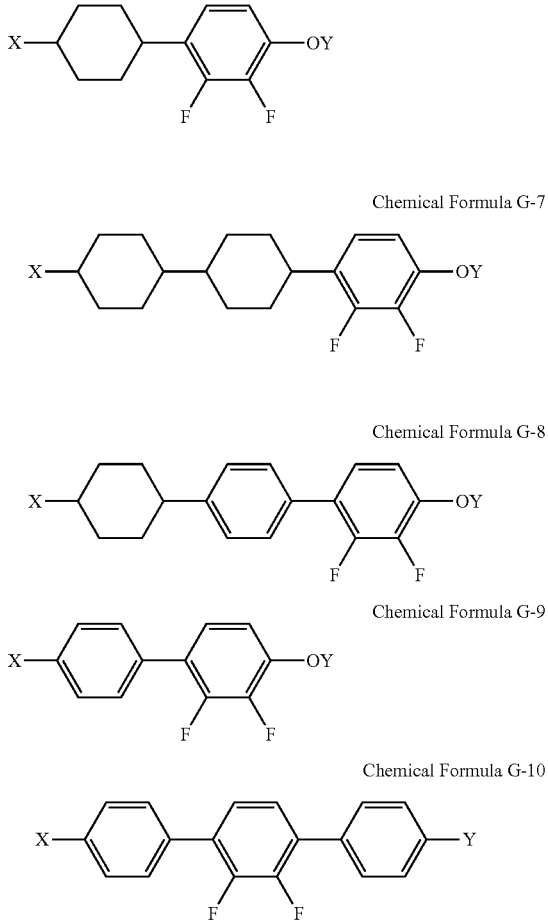

Chemical Formula G-7

Chemical Formula G-8

Chemical Formula G-9

Chemical Formula G-10 wherein in Chemical Formulas G-3 to G-10 above, X comprises one of C1-C5 alkyl groups, and Y comprises one of C1-C5 alkyl groups.

16. The liquid crystal display of claim 13, wherein:
the liquid crystal layer further includes at least one of the polar liquid crystal compounds represented by Chemical Formulas PI-1 to PI-4 below:

Chemical Formula PI-1

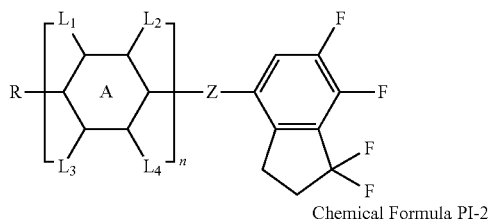

Chemical Formula PI-2

-continued

Chemical Formula PI-3

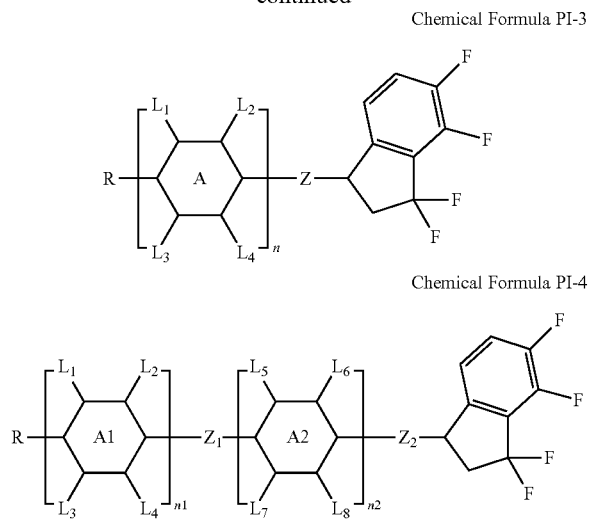

Chemical Formula PI-4 wherein in Chemical Formulas PI-1 to PI-4 above, n, n1, and n2 are 1 to 3; A, A1 and A2 each independently is one of

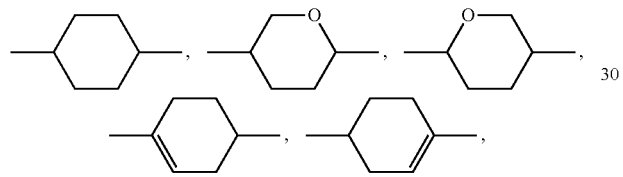

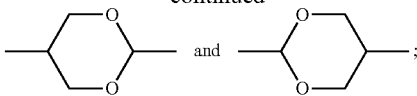

L1 to L8 each independently is H, F, Cl, OCF$_3$, CF$_3$, CH$_2$F and CHF$_2$; Z, Z1, and Z2 each independently is —COO—, —OCO—, —CF$_2$O—, —OCF$_2$—, —CH$_2$O, —OCH$_2$—, —SCH$_2$—, CH$_2$S—, —CH$_2$CH$_2$—, —C$_2$F$_4$—, —CH$_2$CF$_2$—, —CF$_2$CH$_2$—, —(CH$_2$)z- (z is 1 to 3), —CH═CH—, —CF═CF—, —CH═CF—, —CF═CH—, —C═C— and —CH═CHCH$_2$O—, and in Chemical Formulas PI-1 to PI-4 above, each R independently comprises one of hydrogen, halogen, a cyano group and C1 to C12 alkyl groups.

17. The liquid crystal display of claim 16, wherein:
the polar liquid crystal compounds represented by Chemical Formulas PI-1 to PI-4 above have a dielectric anisotropy (Δ∈) of 10 to 30.

18. The liquid crystal display of claim 12, wherein:
the photoinitiator is included in a content of 0.005 wt % to 0.5 wt % (based on the total weight of the liquid crystal layer).

19. The liquid crystal display of claim 18, wherein:
the photoinitiator has a light absorption wavelength range of 240 nanometer to 380 nanometer.

20. The liquid crystal display of claim 12, wherein:
the alignment aid is a compound comprising a polymerization group.

* * * * *